(12) United States Patent
Matsui et al.

(10) Patent No.: US 9,697,589 B2
(45) Date of Patent: Jul. 4, 2017

(54) SIGNAL PROCESSING APPARATUS, IMAGING APPARATUS, SIGNAL PROCESSING METHOD AND PROGRAM FOR CORRECTING DEVIATION OF BLURRING IN IMAGES

(75) Inventors: Akira Matsui, Kanagawa (JP); Takami Mizukura, Kanagawa (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 13/542,189

(22) Filed: Jul. 5, 2012

(65) Prior Publication Data
US 2013/0027587 A1  Jan. 31, 2013
US 2016/0027154 A9  Jan. 28, 2016

Related U.S. Application Data

(63) Continuation-in-part of application No. 13/091,520, filed on Apr. 21, 2011, now Pat. No. 8,947,523.

(30) Foreign Application Priority Data

May 17, 2010  (JP) ................................. 2010-112929
Mar. 25, 2011  (JP) ................................. 2011-068343
Jul. 27, 2011  (JP) ................................. 2011-164266

(51) Int. Cl.
*G06T 5/00* (2006.01)
*H04N 5/222* (2006.01)
(Continued)

(52) U.S. Cl.
CPC .............. *G06T 5/003* (2013.01); *G06T 7/571* (2017.01); *H04N 5/2226* (2013.01); *H04N 5/23212* (2013.01); *H04N 5/23229* (2013.01); *H04N 5/2621* (2013.01); *G06T 2207/10004* (2013.01); *G06T 2207/10148* (2013.01)

(58) Field of Classification Search
None
See application file for complete search history.

(56) References Cited

U.S. PATENT DOCUMENTS 5,552,847 A * 9/1996 Watanabe .............. G03B 17/14
  396/532
2007/0036427 A1* 2/2007 Nakamura et al. ........... 382/154
(Continued)

FOREIGN PATENT DOCUMENTS

JP  2007-66199  3/2007

*Primary Examiner* — Roberto Velez
*Assistant Examiner* — Quan Pham
(74) *Attorney, Agent, or Firm* — Chip Law Group

(57) ABSTRACT

Provided is a signal processing apparatus, including an input unit into which first image data and second image data are input, the first image data and the second image data being obtained by capturing a predetermined subject with an imaging unit and having mutually different states of blurring; a distance information calculation unit that calculates first distance information in accordance with a position in a depth direction of the subject based on the first image data and the second image data; and a distance information correction unit that calculates second distance information by performing, on the first distance information, processing to correct a deviation of the blurring caused by a mismatch between an image-forming plane of the subject and an imaging plane of the imaging unit.

8 Claims, 21 Drawing Sheets

(51) Int. Cl.
*H04N 5/232* (2006.01)
*H04N 5/262* (2006.01)
*G06T 7/571* (2017.01)

(56) References Cited

U.S. PATENT DOCUMENTS

| | | | |
|---|---|---|---|
| 2009/0268985 | A1* | 10/2009 | Wong ..................... G06K 9/209 |
| | | | 382/299 |
| 2010/0053417 | A1* | 3/2010 | Baxansky ..................... 348/345 |
| 2010/0165152 | A1* | 7/2010 | Lim ........................ 348/240.99 |
| 2010/0194971 | A1* | 8/2010 | Li et al. ......................... 348/349 |
| 2011/0075935 | A1 | 3/2011 | Baqai et al. |
| 2011/0150447 | A1* | 6/2011 | Li ................................. 396/104 |
| 2011/0273608 | A1* | 11/2011 | Tsukada ........................ 348/345 |
| 2011/0279699 | A1* | 11/2011 | Matsui ....................... 348/222.1 |

* cited by examiner

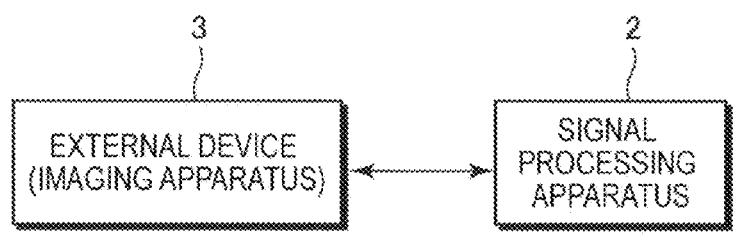
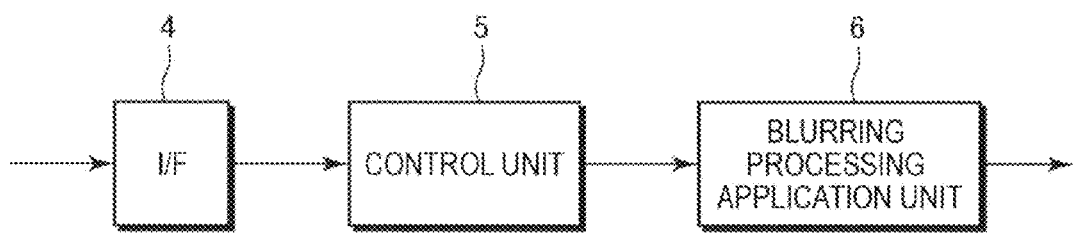
FIG. 2

SIGNAL PROCESSING APPARATUS, IMAGING APPARATUS, SIGNAL PROCESSING METHOD AND PROGRAM FOR CORRECTING DEVIATION OF BLURRING IN IMAGES

CROSS REFERENCE TO RELATED APPLICATIONS

The present application is a continuation-in-part of U.S. patent application Ser. No. 13/091,520 filed on Apr. 21, 2011, which makes reference to, claims priority to and claims benefit from Japanese Priority Patent Application JP 2011-068343 filed in the Japan Patent Office on Mar. 25, 2011 and Japanese Priority Patent Application JP 2010-112929 filed in the Japan Patent Office on May 17, 2010. The present application contains subject matter related to that disclosed in Japanese Priority Patent Application JP 2011-164266 filed in the Japan Patent Office on Jul. 27, 2011, the entire content of which is hereby incorporated by reference.

BACKGROUND

The present disclosure relates to, for example, a signal processing apparatus that appropriately calculates distance information, an imaging apparatus, a signal processing method, and a program.

In recent years, a small-area image sensor is frequently used for compact digital still cameras due to a demand for compactness. For example, a 1/2.33 type CCD (6.2×4.6) is used. As large-format image sensors, on the other hand, the 35-mm film size (36×24) and the APS-C size (23.4×16.7) are known.

In a compact digital still camera with such a small screen size, the depth of field becomes deep and a blurring effect normally obtained by a conventional film camera and a digital single-lens reflex camera using a large-format image sensor is extremely small. The blurring effect is demanded for portrait imaging in which a person is made to stand out by blurring the background. Against the above background, as described in Japanese Patent Application Laid-Open No. 2007-66199, techniques to obtain a large blurring effect even in a digital still camera using a small image sensor have been proposed.

According to the method described in Japanese Patent Application Laid-Open No. 2007-66199, faces and persons are detected from a portrait image shot and locations other than faces and persons are considered to be the background and blurring processing is performed thereon.

SUMMARY

The method described in Japanese Patent Application Laid-Open No. 2007-66199 applies blurring processing uniformly to the background. However, different amounts of blurring should be added to subjects contained in the background in different distances and the method described in Japanese Patent Application Laid-Open No. 2007-66199 poses a problem from the viewpoint of adding natural blurring. Further, the method described in Japanese Patent Application Laid-Open No. 2007-66199 poses a problem that it is difficult to apply the method to other subjects than persons. Further, the method described in Japanese Patent Application Laid-Open No. 2007-66199 poses a problem that a deviation of blurring caused by a mismatch between an image-forming plane of a subject and an imaging plane of an imaging unit such as a curvature of field is not taken into consideration.

Therefore, it is desirable to provide a signal processing apparatus that corrects an error of distance information caused by, for example, a deviation of blurring, an imaging apparatus, a signal processing method, and a program.

To solve the above problems, the present disclosure is, for example, a signal processing apparatus including an input unit into which first image data and second image data are input, the first image data and the second image data being obtained by capturing a predetermined subject with an imaging unit and having mutually different states of blurring, a distance information calculation unit that calculates first distance information in accordance with a position in a depth direction of the subject based on the first image data and the second image data, and a distance information correction unit that calculates second distance information by performing, on the first distance information, processing to correct a deviation of the blurring caused by a mismatch between an image-forming plane of the subject and an imaging plane of the imaging unit.

The present disclosure is, for example, a imaging apparatus, including an imaging unit, an input unit into which first image data and second image data are input, the first image data and the second image data being obtained by capturing a predetermined subject with the imaging unit and having mutually different states of blurring, a distance information calculation unit that calculates first distance information in accordance with a position in a depth direction of the subject based on the first image data and the second image data, and a distance information correction unit that calculates second distance information by performing, on the first distance information, processing to correct a deviation of the blurring caused by a mismatch between an image-forming plane of the subject and an imaging plane of the imaging unit.

The present disclosure is, for example, a signal processing method, including inputting first image data and second image data, the first image data and the second image data being obtained by capturing a predetermined subject with an imaging unit and having mutually different states of blurring, calculating first distance information in accordance with a position in a depth direction of the subject based on the first image data and the second image data, and calculating second distance information by performing, on the first distance information, processing to correct a deviation of the blurring caused by a mismatch between an image-forming plane of the subject and an imaging plane of the imaging unit.

The present disclosure is, for example, a program causing a computer to execute a signal processing method, including inputting first image data and second image data, the first image data and the second image data being obtained by capturing a predetermined subject with an imaging unit and having mutually different states of blurring, calculating first distance information in accordance with a position in a depth direction of the subject based on the first image data and the second image data, and calculating second distance information by performing, on the first distance information, processing to correct a deviation of the blurring caused by a mismatch between an image-forming plane of the subject and an imaging plane of the imaging unit.

According to at least one embodiment, high-precision distance information having a minor error can be obtained by performing processing that takes a deviation of blurring into consideration.

BRIEF DESCRIPTION OF THE DRAWINGS

FIG. 1 is a block diagram exemplifying the configuration of a system according to a first embodiment of the present disclosure;

FIG. 2 is a block diagram exemplifying a main configuration of a signal processing apparatus according to the first embodiment of the present disclosure;

FIG. 21 is a flow chart illustrating processing to correct distance information according to the first embodiment of the present disclosure;

DETAILED DESCRIPTION OF THE EMBODIMENTS

Figure 3:
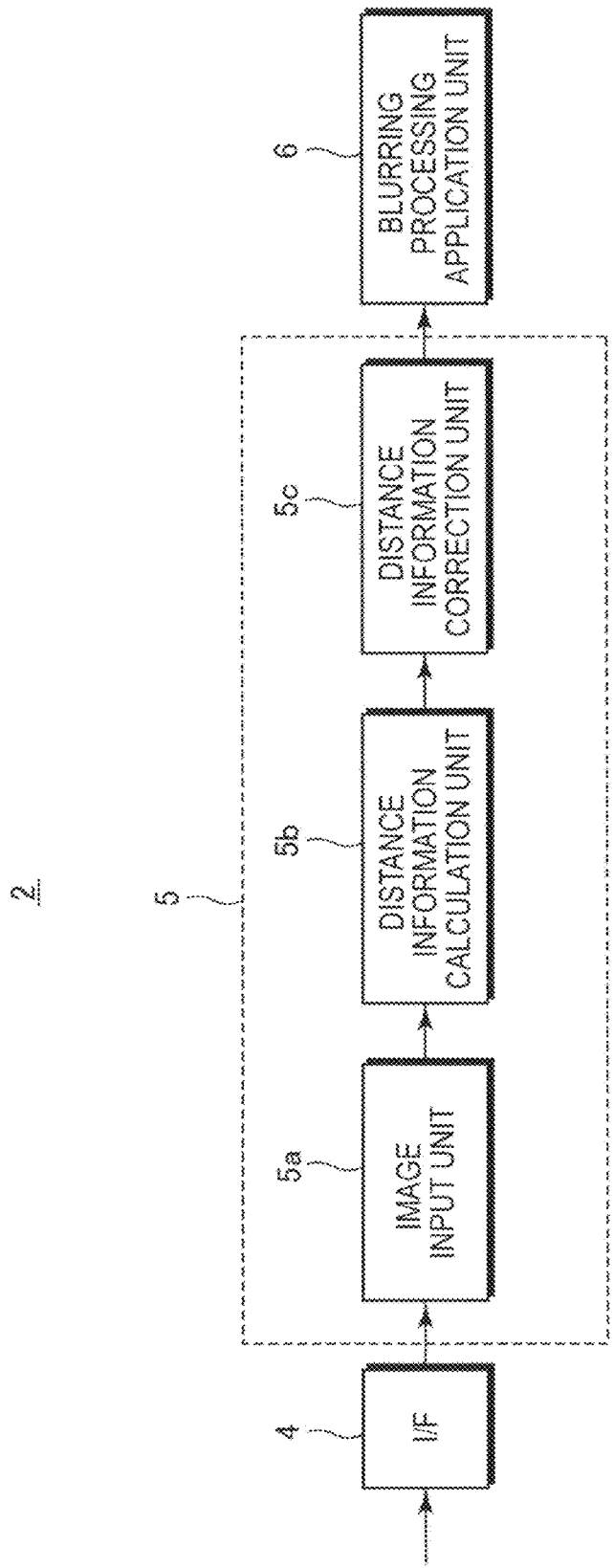
FIG. 3 is a block diagram exemplifying a detailed configuration of a control unit of the signal processing apparatus according to the first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments of the present disclosure will be described below. The description will be provided in the order shown below:

<1. First Embodiment>
<2. Second Embodiment>
<3. Third Embodiment>
<4. Modification>

However, the present disclosure is not limited to the embodiments and modification described below.

<1. First Embodiment> "Overall Configuration of System"

The first embodiment of the present disclosure will be described. FIG. 1 shows an example of a system according to the first embodiment of the present disclosure. A system 1 is constituted of, for example, a signal processing apparatus 2 and an external device 3 connected to the signal processing apparatus 2. The signal processing apparatus 2 is a device such as a personal computer and TV set. The external device 3 is, for example, an imaging apparatus having an imaging function such as a digital still camera. Bidirectional communication by wire or by radio is performed between the signal processing apparatus 2 and the imaging apparatus 3. For example, a plurality of pieces of image data containing two pieces of image data in different blurred states and specific information such as an f-number of the imaging apparatus 3 are transmitted from the imaging apparatus 3 to the signal processing apparatus 2 by the communication. The image data is, for example, data obtained by a specific subject being imaged by an imaging unit of the imaging apparatus 3.

"Configuration of the Signal Processing Apparatus"

FIG. 2 shows an example of a main configuration of the signal processing apparatus 2. The signal processing apparatus 2 includes, for example, an interface (I/F) 4 between the signal processing apparatus 2 and the imaging apparatus 3, a control unit 5, and a blurring processing application unit 6. The signal processing apparatus 2 may include other configurations. For example, the signal processing apparatus 2 may be configured to include an operation unit such as a keyboard and a mouse, a display unit, or a speaker. Further, the signal processing apparatus 2 may also be configured to include a communication unit to connect to a network such as the Internet. A plurality of pieces of image data containing two pieces of image data in different blurred states may be supplied to the signal processing apparatus 2 from an external device connected to a network via the communication unit.

The control unit 5 is configured by, for example, a CPU (Central Processing Unit). A ROM (Read Only Memory) or a RAM (Random Access Memory) may be connected to the control unit 5. The control unit 5 performs predetermined processing according to, for example, a program stored in the ROM. The control unit 5 performs, for example, processing to generate a distance map by determining distance information and processing to correct the distance map.

The blurring processing application unit 6 performs blurring processing on image data by using a distance map supplied by the control unit 5. The function of the blurring processing application unit 6 may be incorporated into the control unit 5. Further, the processing by the blurring processing application unit 6 may be performed by another apparatus separate from the signal processing apparatus 2.

"Configuration of the Control Unit"

FIG. 3 shows an example of a detailed configuration of the control unit 5.

The control unit 5 is constituted of, for example, an image input unit 5a, a distance information calculation unit 5b, and a distance information correction unit 5c. For example, a plurality of pieces of image data containing two pieces of image data in different blurred states is input into the image input unit 5a. The plurality of pieces of image data is supplied to the distance information calculation unit 5b from the image input unit 5a. The plurality of pieces of supplied image data is stored in the RAM or the like.

One piece of image data of the plurality of pieces of image data is image data (first image) focused on a subject, for example, a person in the foreground. Another piece of image data of the plurality of pieces of image data is image data (second image) of the same subject photographed by shifting the focus to the far side by a predetermined distance with respect to the first image. Still another piece of image data of the plurality of pieces of image data is image data (third image) of the same subject photographed by shifting the focus to the near side by the predetermined distance with respect to the first image.

The three images are images having mutually different degrees of blurring. The foreground is in focus in the first image and thus, the degree of the foreground being out of focus in the second image and the degree of the foreground being out of focus in the third image are equal. The degree of blurring of the background in the third image is larger than the degree of blurring of the background in the second image. Image data corresponding to the three images is supplied to, for example, the distance information calculation unit 5b. Image data corresponding to the first image may directly be supplied to the blurring processing application unit 6 without going through the control unit 5.

The distance information calculation unit 5b performs processing to determine the first distance information by using supplied image data. The distance information is a distance in accordance with the position of a subject in a depth direction and, for example, the distance between the foreground and the background. The distance information is determined in units of, for example, pixels of image data. The distance information may also be determined in units of blocks of image data. The distance information is determined for each pixel by the distance information calculation unit 5b to generate a distance map before correction constituted of distance information for all pixels.

The distance map generated by the distance information calculation unit 5b is supplied to the distance information correction unit 5c. The distance information correction unit 5c performs processing to correct distance information for each pixel of the supplied distance map. The distance information correction unit 5c performs correction processing to correct the deviation of blurring on, for example, distance information for each pixel. Distance information after the correction, which is second distance information, is determined by the correction processing. Distance information of all pixels is corrected to generate a distance map after the correction (corrected distance map) constituted of corrected distance information. The generated corrected distance map and image data corresponding to the first image data are supplied to the blurring processing application unit 6. The blurring processing application unit 6 refers to the supplied corrected distance map to perform blurring processing on the image data corresponding to the first image data.

"Overall Flow of the Processing"

Figure 4:
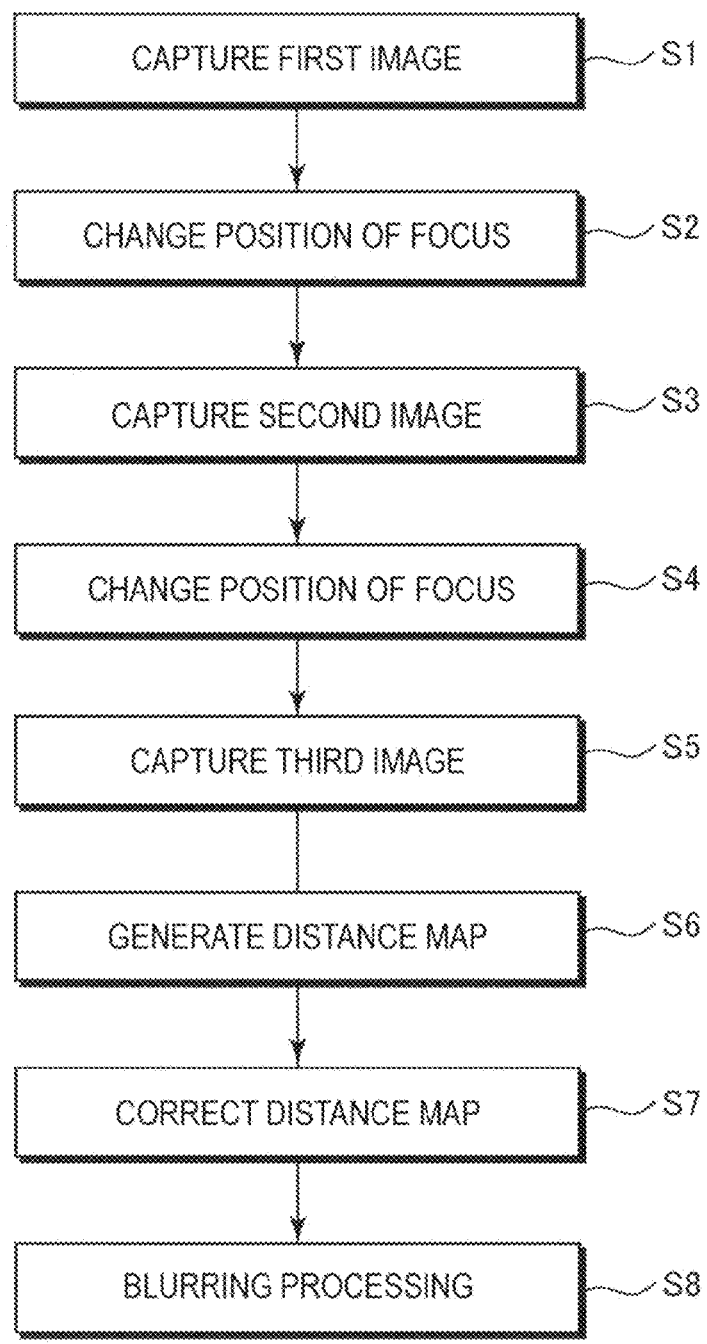
FIG. 4 is a flow chart illustrating an example of a processing overview according to an embodiment of the present disclosure.

The overall flow of the processing will be described by referring to FIG. 4. In FIG. 4, for example, processing of steps S1 to S5 is performed by the imaging apparatus 3 and processing of steps S6 to S8 is performed by the signal processing apparatus 2.

In the first step S1, the first image is captured. In the case of, for example, portrait, the image is captured in such a way that a person in the foreground is in focus. The first image is temporarily stored. Next, in step S2, the position of focus is changed by a predetermined amount to the far side with respect to the first image. Then, in step S3, the second image is captured. The second image is temporarily stored.

Next, in step S4, the position of focus is changed by the predetermined amount to the near side with respect to the first image. The change of the position of focus is assumed to be equal to the change when the second image is acquired. Then, in step S5, the third image is captured. The captured three images (the first image, second image, and third image) are supplied to the distance information calculation unit 5b via the image input unit 5a.

Next, in step S6, for example, distance information (first distance information) for each pixel is calculated by using the second image and third image. The processing in step S6 is performed by, for example, the distance information calculation unit 5b. The, a distance map constituted of distance information for all pixels is generated. The generated distance map is supplied to the distance information correction unit 5c. In the description that follows, calculating distance information may be denoted as distance estimation or estimating the distance.

Next, in step S7, processing to correct the distance map may be performed. The processing in step S7 is performed by, for example, the distance information correction unit 5c. In step S7, the distance information for each pixel in the supplied distance map is corrected to generate a corrected distance map constituted of distance information of all pixels after the correction. The generated corrected distance map is supplied to the blurring processing application unit 6. Lastly, in step S8, blurring processing is applied to the first image while the corrected distance map being referred to. The processing in step S8 is performed by, for example, the blurring processing application unit 6.

For the processing in step S8, for example, a low-pass filter can be used. Whether a low-pass filter is applicable and the strength thereof (the lower the cutoff frequency, the stronger the strength thereof) are set in accordance with distance information of each pixel in the corrected distance map. That is, for example, the low-pass filter is not applied to the foreground (person) and the low-pass filter of the strength in accordance with the distance from the foreground is applied to the background. A portrait image with a blurred background suitable for appreciation can be generated by the blurring processing. Incidentally, the foreground is not limited to persons and is set appropriately in accordance with the subject. For example, an animal or fruit may be the foreground.

[Distance Map Generation Processing]

Figure 5:
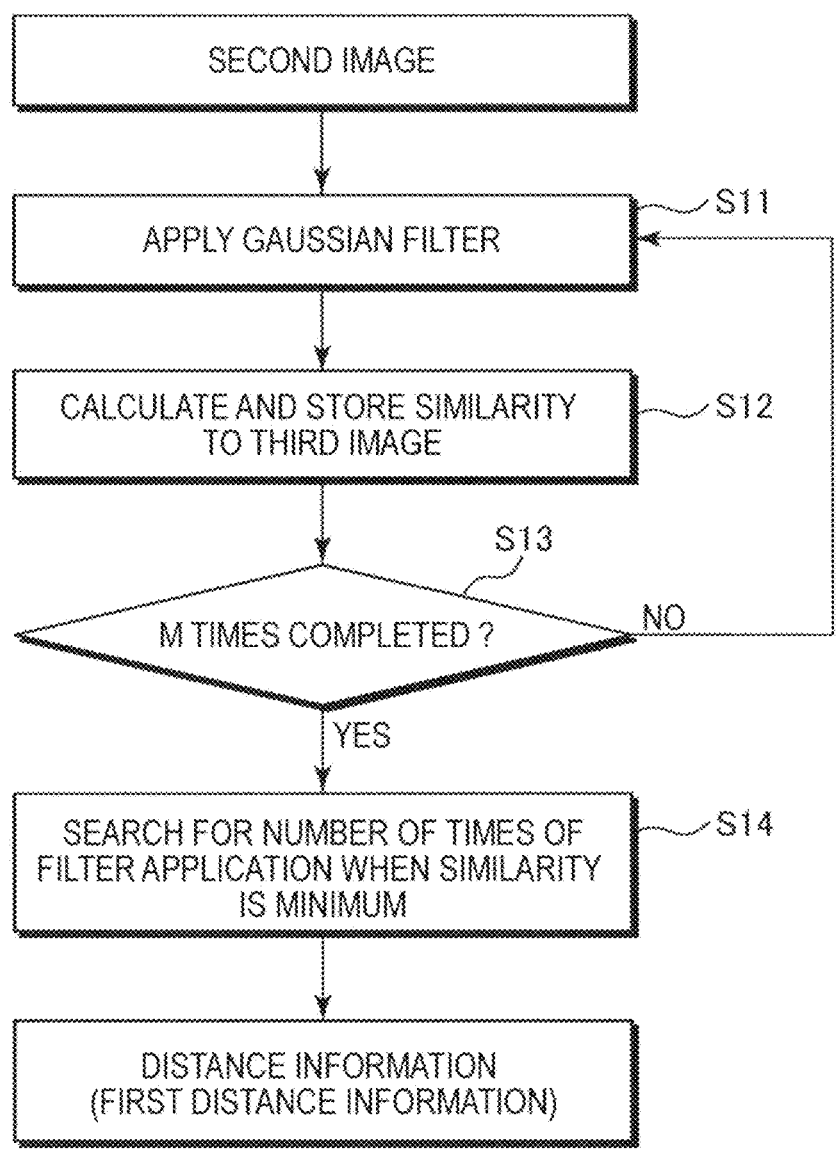
FIG. 5 is a flow chart illustrating an example of processing to calculate first distance information according to an embodiment of the present disclosure.
Figure 6:
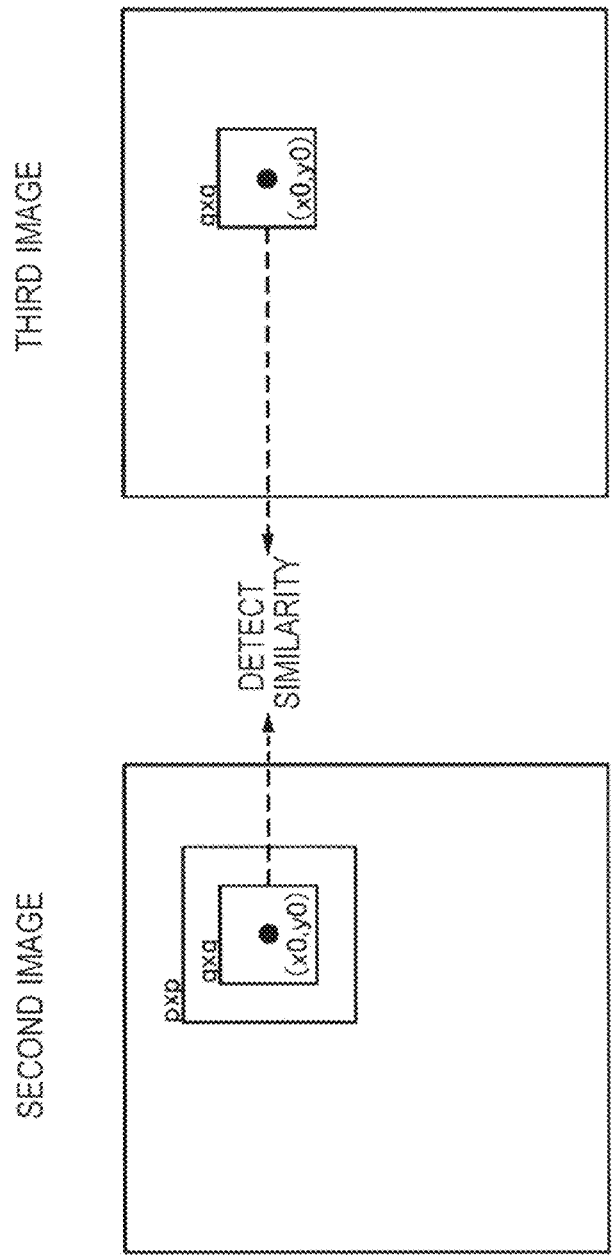
FIG. 6 is a schematic diagram illustrating an example of the processing to calculate the first distance information according to an embodiment of the present disclosure.

Step S6 (distance map generation) in FIG. 4 will be described in more detail with reference to FIGS. 5 and 6. FIG. 6 shows the second image and the third image. First, as shown in FIG. 6, any pixel in the second image is selected and coordinates thereof are set as (x0, y0). The range of (p×p) is defined by p, which is a sufficiently large value compared with the value of q described later, by setting (x0, y0) as the center thereof. A convolution operation by the filter is performed for pixel values contained in the range of (p×p) of the second image (step S11 in FIG. 5). For example, a convolution operation using a predetermined Gaussian filter is performed. The Gaussian filter is a blurring filter using a Gaussian function. That is, in the Gaussian filter, the weight for combining pixels is decided by a Gaussian function in accordance with the distance from the center pixel.

Next, in step S12, a similarity between the pixel value in the range of (q×q) around (x0, y0) of the resultant pixel value in step S11 and the pixel value in the range of (q×q) around (x0, y0) of the third image is calculated. As the similarity, SAD (Sum of Absolute Difference) or the like can be used. For example, SAD is a value obtained by determining an absolute value of a difference of two pixel values corresponding to the same position between the range of (q×q) of the second image and the range of (q×q) of the third image and integrating the absolute value of the difference for (q×q) pixels. The value of SAD decreases with an increasing similarity.

In determination processing (step S13) after step S12, whether the calculation of similarity and processing to store the value of similarity have been performed M times is determined. M is a sufficiently large value. If it is determined that the calculation of similarity and processing to store the value of similarity have been performed M times, the processing proceeds to step S14. In step S14, the maximum value (the minimum value when SAD is used as the similarity) of similarity among stored similarities for M times is searched for. A number of repetitions k in step S11 and step S12 corresponding to the maximum number of similarity is set as distance information (first distance information). In the number of times of blurring processing by the Gaussian filter, the number of times of processing in which blurring is not added may be set to 0. When a similarity is calculated, a comparison is also made before blurring processing by the Gaussian filter is performed.

Areas in the foreground of the second image and the third image have approximately similar blurring added thereto and thus, SAD is determined to be small and the similarity is determined to be large. The degree of blurring of the background in the third image is larger than the degree of blurring of the background in the second image and thus, the similarity increases by performing processing to add blurring on the second image.

As a method of determining the maximum value of similarity, a method of not repeating processing of the preset M times is also possible. If, for example, SAD is used, a minimum value of SAD may be detected to set the number of times k before the minimum value of SAD is generated as distance information. Further, instead of the absolute value of difference, the square of difference may be used as the similarity. Further, the similarity may be detected by using other parameters than SAD.

As described above, k is determined for each of all pixels in an image. In a distance map, the determined value of k is present for each pixel. In this case, a distance map in which the value of k is determined for pixels sampled at predetermined intervals in the horizontal direction and/or the vertical direction, instead of all pixels, may be created to reduce the amount of computation.

To reduce the amount of computation to decrease the load of processing, distance information may be determined for each predetermined range. The predetermined range can appropriately be set like 3 pixels×3 pixels and 5 pixels×5 pixels. A representative pixel in the predetermined range is selected. The pixel positioned in the center of the predetermined range or the like can appropriately be set as the representative pixel. Then, the distance information k of the representative pixel is calculated by the above method. The calculated distance information k about the representative pixel may be used as distance information for each pixel contained in the predetermined range.

If the range is, for example, 3 pixels×3 pixels, 5 pixels×5 pixels or so, the distance information k of adjacent pixels does not change significantly. Therefore, instead of individually determining the distance information k for each pixel in the predetermined range, almost no practical problem is caused by approximation using the distance information k of the representative pixel. As another method, the distance information k may be determined by averaging a parameter to determine the distance information k in the predetermined range and using the average of the parameter.

Next, why the value of k can be distance information will be described. First, the following symbols are defined:

Img: Image in focus to which a blurring function by defocusing is not applied $\sigma_2, \sigma_3$: Standard deviation of the blurring function (two-dimensional isotropic Gaussian function) in the second image and the third image respectively $\sigma_f$: Standard deviation of the Gaussian filter applied in step S11

Figure 7:
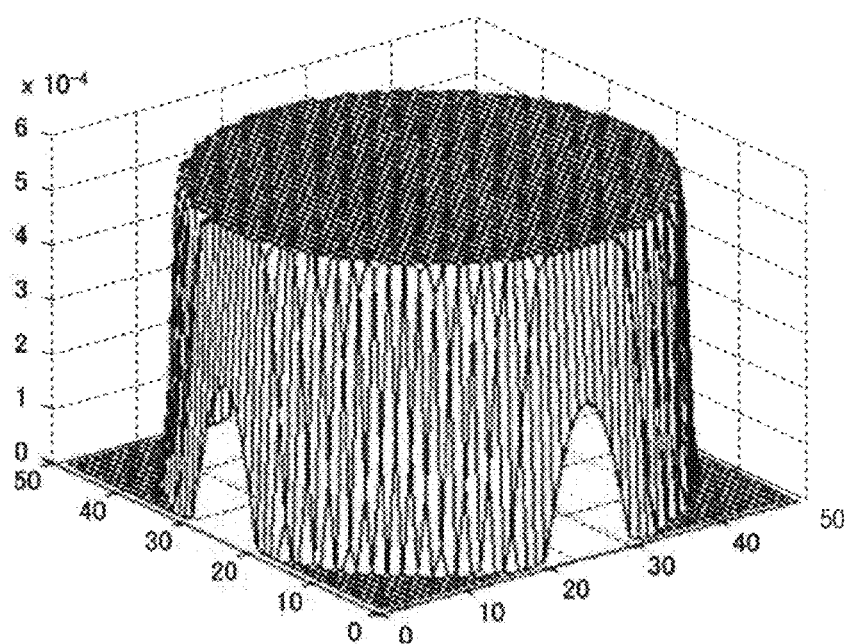
FIG. 7 is a schematic diagram used for describing a Pill Box function.

The blurring function by defocusing is geometrical-optically determined as a Pill Box function having a blur circle diameter as shown in FIG. 7. When a point image is in focus, the point image is generated on the imaging plane, but when the point image is out of focus, a circular image is generated by blurring. This circle is called a blur circle.

Figure 8:
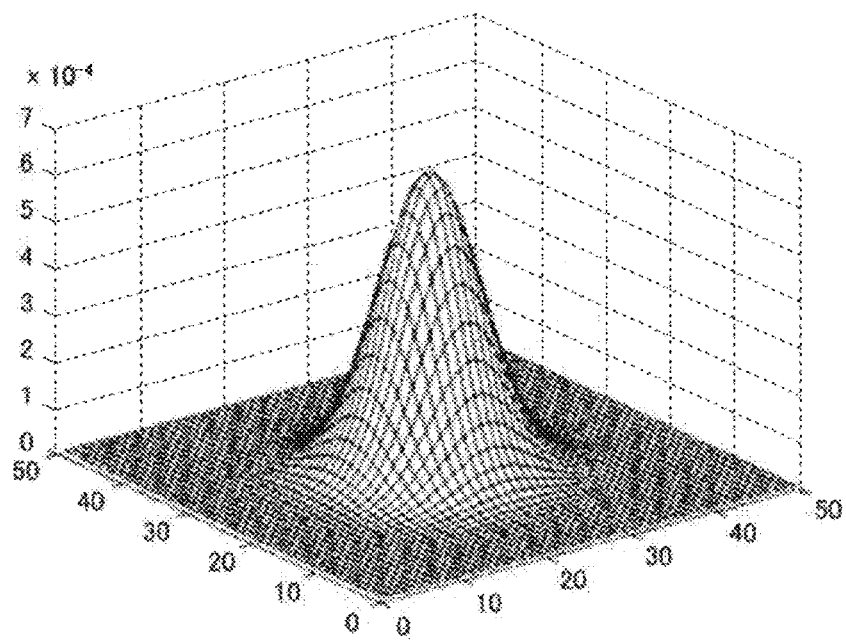
FIG. 8 is a schematic diagram used for describing the Gaussian filter.

For an actual lens, however, in consideration of the influence of aberration and the like, the blurring function is frequently approximated as a two-dimensional isotropic Gaussian function as shown in FIG. 8. In FIG. 8, the center position is the position of a pixel (attention pixel) to be processed. The Gaussian filter has a distribution (function of the Gaussian distribution) in which the weight when an average value is calculated increases with a decreasing distance to the position of the attention pixel and the weight decreases with an increasing distance from the pixel in the attention position. The smaller the standard deviation and the narrower the width of distribution, the smaller the effect of smoothing.

Also in the first embodiment of the present disclosure, the blurring function when the second image and the third image are defocused is approximated as a two-dimensional isotropic Gaussian function and the standard deviation thereof is assumed to be $\sigma_2$ and $\sigma_3$ respectively. In this case, the process to determine k in the processing shown in FIG. 5 corresponds to the determination of k by the following formula (1) ($G(\mu, \sigma)$ is a two-dimensional isotropic Gaussian function of the average $\mu$ and the standard deviation $\sigma$). Further, the variance is a squared expected value of shifts from the average.

$$\text{Im}g \otimes G(0, \sigma_3) = \text{Im}g \otimes G(0, \sigma_2) \otimes \underbrace{G(0, \sigma_f) \otimes G(0, \sigma_f) \ldots \otimes G(0, \sigma_f)}_{k} \quad (1)$$

By using the fact that a convolution of Gaussian functions generally becomes a Gaussian function and the sum of variances of two Gaussian functions to be convoluted ($\sigma_2^2 + \sigma_3^2$) matches the variance of the resultant Gaussian function of the convolution, k can be described by the following formula (2):

$$k = \frac{\sigma_3^2 - \sigma_2^2}{\sigma_f^2} = \frac{(\sigma_3 - \sigma_2)(\sigma_3 + \sigma_2)}{\sigma_f^2} \quad (2)$$

From the formula (2), k has the following relationships. (1) k is inversely proportional to the square of $\sigma_f$. If $\sigma_f$ is a constant value, the denominator of the formula (2) becomes a constant value.

(2) k is proportional to ($\sigma_3 - \sigma_2$). ($\sigma_3 - \sigma_2$) can approximately be interpreted as a difference of blur circle diameters of the blurring function of defocusing in the second image and the third image. This value becomes a constant value if the amounts of defocusing of the second image and the third image with respect to the first image are maintained constant. That is, if settings are made so that, for example, the second image is defocused by 2DoF (depth of field) to the far side with respect to the first image and the third image is defocused by 2DoF to the near side with respect to the first image, ($\sigma_3 - \sigma_2$) becomes a constant value of four times the value of the permissible blur circle.

(3) k is proportional to ($\sigma_3 + \sigma_2$). ($\sigma_3 + \sigma_2$) can approximately be interpreted as a sum or twice the average value of blur circle diameters of the blurring function of defocusing in the second image and the third image.

For example, as described above, the second image is defocused by 2DoF to the far side with respect to the first image and the third image is defocused by 2DoF to the near side with respect to the first image. If the relative distance between the foreground position to be focused when the first image is acquired and the background position is nDoF, $\sigma_2$ becomes the value (n−2) times the permissible blur circle and $\sigma_3$ becomes the value (n+2) times the permissible blur circle and thus, ($\sigma_3 + \sigma_2$) becomes the value 2n times the permissible blur circle and therefore, ($\sigma_3 + \sigma_2$) is proportional to the relative distance n between the foreground position and the background position.

Figure 9:
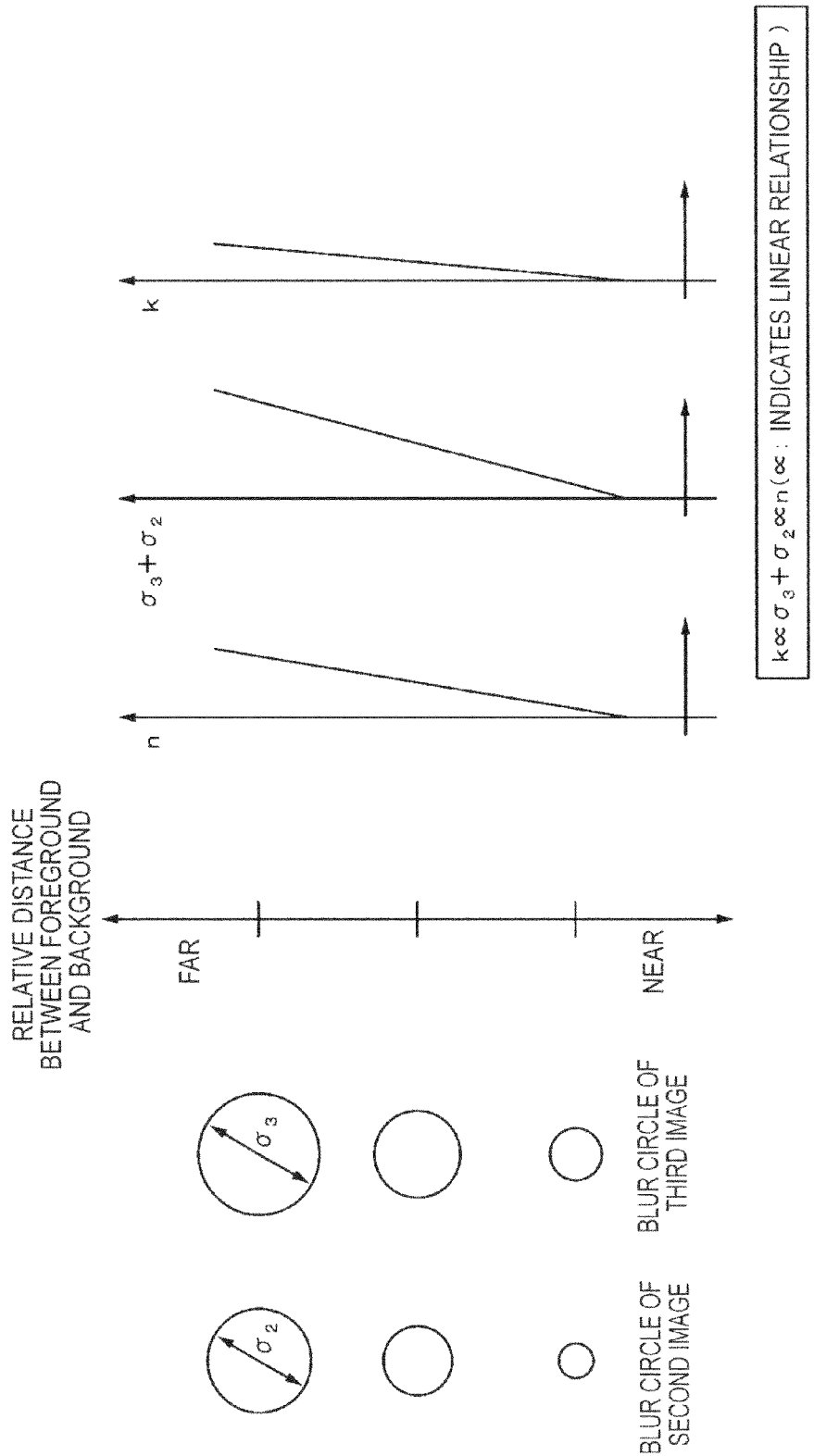
FIG. 9 is a schematic diagram illustrating an example of the processing to calculate the first distance information according to an embodiment of the present disclosure.

From the above relationships, k has a property of being proportional to the relative distance n between the foreground position and the background position in the end. Due to this property, distance information proportional to the relative distance between the foreground and the background can be obtained by calculating k. FIG. 9 shows relationships among k, n, and ($\sigma_3 + \sigma_2$). That is, FIG. 9 schematically shows the relationship $k \propto \Sigma_3 + \sigma_2 \propto n$ ($\propto$ indicates a linear relationship).

"Blurring Processing"

The calculated distance information k is corrected by the processing in step S7 of FIG. 4. The processing in step S7 will be described later. In step S8 of FIG. 4, blurring processing is performed by the blurring processing application unit 6 in accordance with the calculated value of k after the correction in each pixel position in the image. That is, if the value of k after the correction is large, stronger blurring processing is performed and if the value of k after the correction is small, weaker blurring processing or no blurring processing is performed. By performing such blurring processing, an image suitable for appreciation with an appropriately blurred background can be obtained.

By using the calculated k after the correction, as will be described below, the blurring processing in step S8 may be performed by determining the relative physical distance $s_f$ between the foreground position and the background position and using $s_f$. First, the following formula (3) is generally derived from a formula of geometrical optics of a thin lens.

$$s_f = \frac{f^2(s-f)}{f^2 - \delta F(s-f)} + f \quad (3)$$

In the formula (3), f is a focal length, F is an f-number, s is a focusing distance, $\delta$ is a blur circle diameter, and $s_f$ is a far-side subject distance. f, F, and s are control values of a lens and known and if $\delta$ is known, $s_f$ can be determined. Geometrical-optically, a blurring function has some blur circle diameter represented as a Pill Box function and here, the average value of $\sigma_3$ and $\sigma_2$ determined from the formula (2) is considered to be approximately the blur circle diameter. The formula (4) is substituted as $\delta$ in the formula (3).

$$\frac{\sigma_3 + \sigma_2}{2} = \frac{k\sigma_f^2}{2(\sigma_3 - \sigma_2)} \quad (4)$$

$$s_f = \frac{f^2(s-f)}{f^2 - \frac{k\sigma_f^2 F(s-f)}{2(\sigma_3 - \sigma_2)}} + f \quad (5)$$

The blurring processing in step S8 may be performed by using a relative separation distance Sf between the foreground position and the background position determined by the formula (5).

"Influence by the Deviation of the Blurring Function"

k or $s_f$ derived heretofore contains, as represented by the formula (1), a precondition that the blurring function is a two-dimensional isotropic Gaussian function. Though, as described above, the blurring function is geometrical-optically determined as a Pill Box function, but in consideration of the influence of diffraction and aberration of an actual lens, the blurring function is frequently approximated as a two-dimensional isotropic Gaussian function.

Further, as a precondition, the blurring function is assumed to be constant. However, a deviation is caused by a mismatch of the image-forming plane of a subject and the imaging plane in the blurring function of an actual lens. In other words, the blurring function of an actual lens is different in magnitude (the blur circle diameter or if the blurring function is considered as a Gaussian function, the standard deviation thereof) in accordance with the position on the imaging plane. An increasing error arises in the distance estimation with an increasing deviation of the blurring function (with an increasing difference in magnitude of the blurring function). Various kinds of aberration and variations in production and assembly of lenses can be cited as causes of a deviation of the blurring function. Among these causes, particularly "curvature of field" and "single-sided blurring" can be cited as causes of an increasing deviation of the blurring function. "Curvature of field" and "single-sided blurring" will be described below.

"Curvature of Field"

Figure 10:
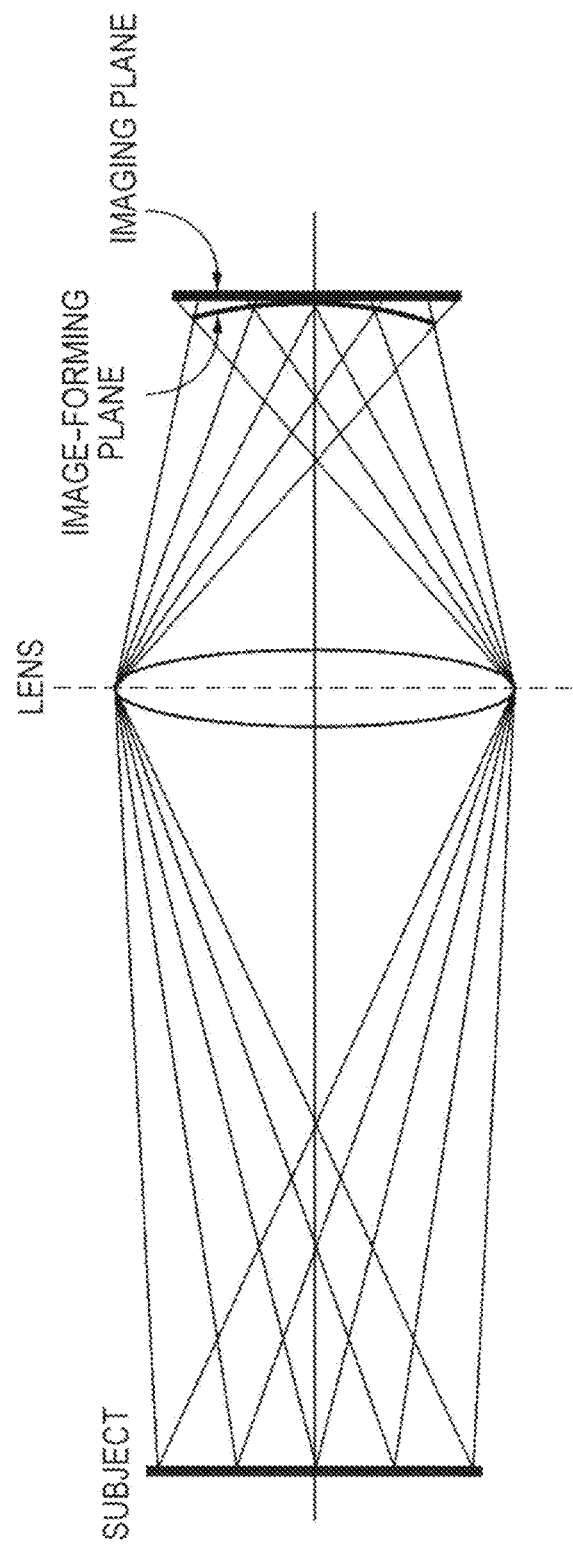
FIG. 10 is a schematic diagram illustrating an example of a curvature of field.

The curvature of field is a typical aberration. FIG. 10 schematically shows how a curvature of field is generated. The imaging plane corresponds to the position and/or shape of an image sensor like, for example, CCD (Charge Coupled Device) and CMOS (complementary Metal Oxide Semiconductor). The imaging plane is, for example, a plane linking photoelectric conversion positions where photoelectric conversion is performed in an image sensor. The image-forming plane is, for example, a plane linking image-forming positions of each point on a planar subject plane. If a subject in any position on a planar subject plane is formed as an image in focus on a plane imaging plane, no curvature of field is generated. However, an actual lens has a curved image-forming plane and the image-forming plane and the imaging plane do not match, causing a mismatch. This kind of aberration is called a curvature of field.

Figure 11:
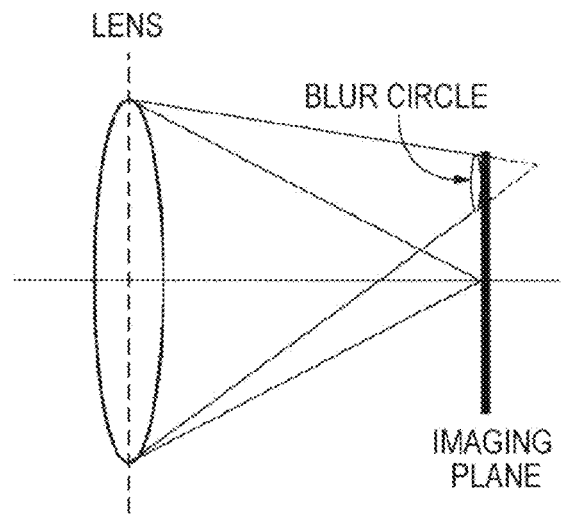
FIG. 11 is a schematic diagram illustrating an example of a blur circle caused by the curvature of field.
Figure 12:
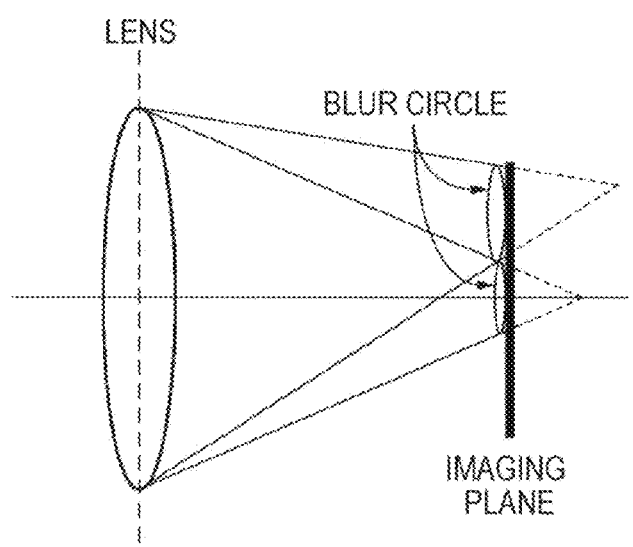
FIG. 12 is a schematic diagram illustrating another example of the blur circle caused by the curvature of field.

If a curvature of field arises, the captured image is in focus in, for example, the center of the imaging plane, but blurring arises in portions other than the center in accordance with the amount of curvature of field. An example of this state is shown in FIG. 11. Further, if the center of the imaging plane is out of focus, the blurring function is different in magnitude between the center of the imaging plane and other portions than the center. An example of this state is shown in FIG. 12. The amount of curvature of field and a resultant amount of blurring of a captured image are rotationally symmetric with respect to an optical axis from the generation principle thereof.

"Single-sided Blurring"

Figure 13:
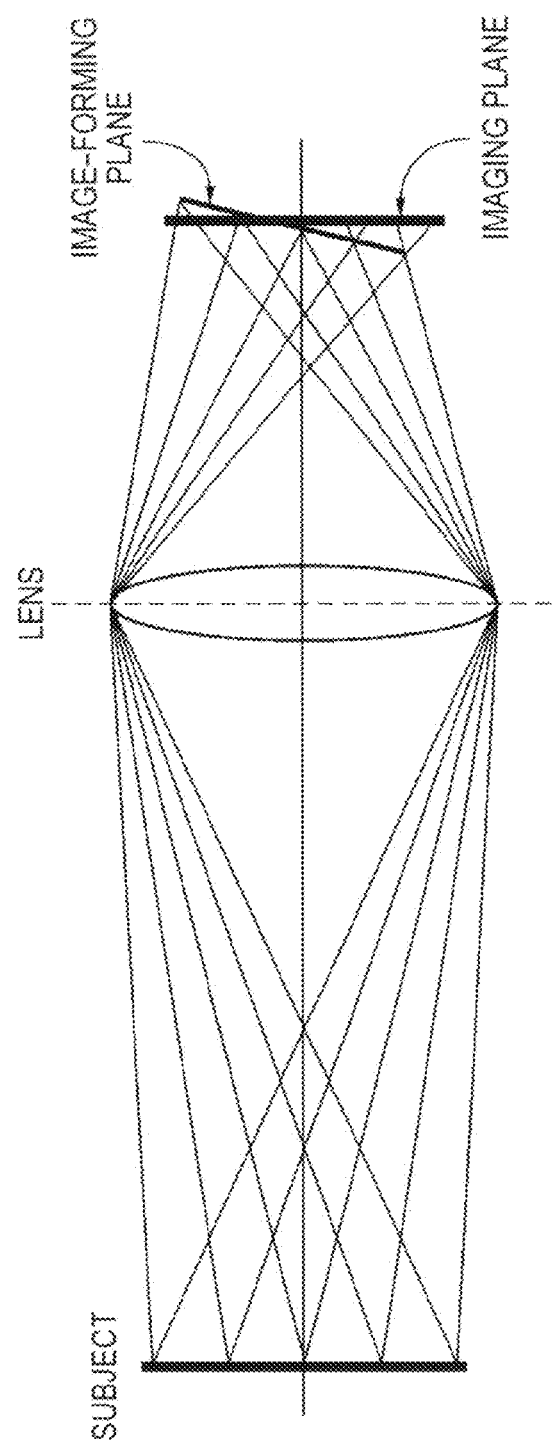
FIG. 13 is a schematic diagram illustrating an example of single-sided blurring.
Figure 14:
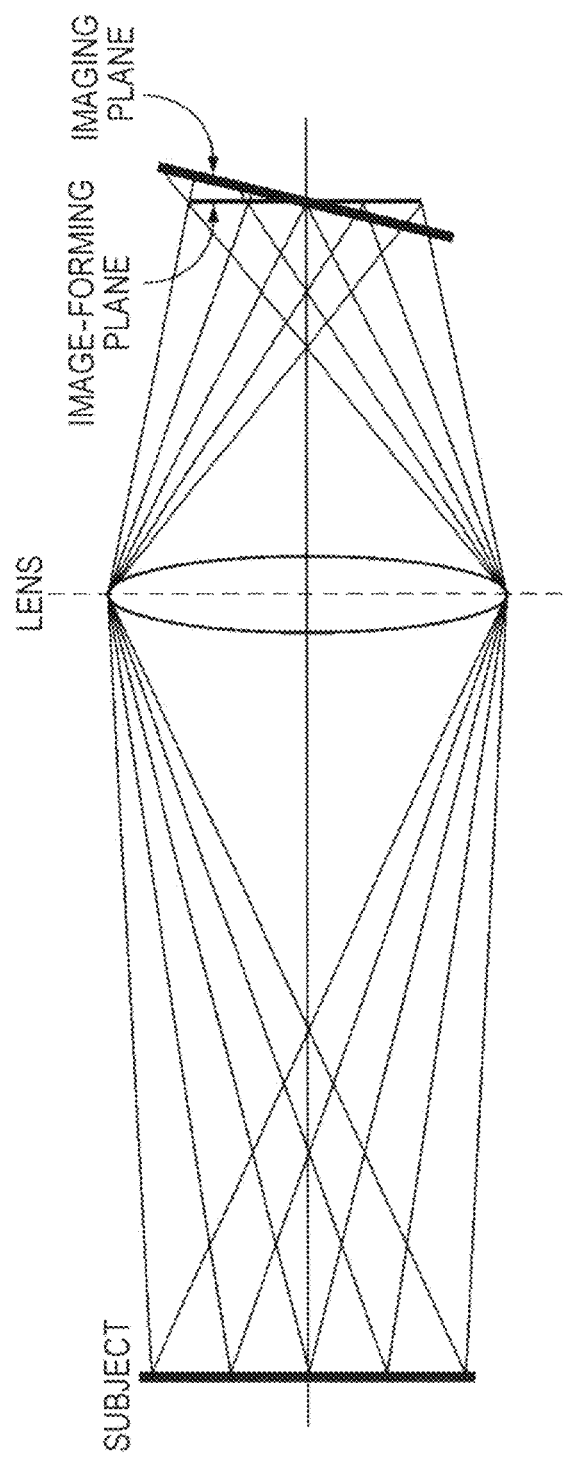
FIG. 14 is a schematic diagram illustrating another example of the single-sided blurring.

Single-sided blurring is caused by, for example, variations in production and assembly of lenses, variations in assembly of lenses and image sensors, or combined factors thereof. FIGS. 13 and 14 schematically show how single-sided blurring is generated. The example of single-sided blurring shown in FIG. 13 is an example in which single-sided blurring is caused by variations in production and assembly of lenses. Due to variations in production and assembly of lenses, the image-forming plane linking image-forming positions of each point on a planar subject plane perpendicular to the optical axis does not match the imaging plane perpendicular to the optical axis. Though similar to the curvature of field, the amount of shift of the image-forming position from the imaging plane is not rotationally symmetric and this is different from the case caused by aberration.

FIG. 14 shows an example of single-sided blurring generated by variations in assembly of lenses and image sensors. Though the image-forming plane is perpendicular to the optical axis, the image-forming plane and the imaging plane do not match due to the presence of the image sensor. In both cases of FIGS. 13 and 14, the captured image is in focus near the center of the imaging plane, but blurring arises in portions other than the center in accordance with the amount of single-sided blurring. Further, if the center of the imaging plane is not in focus, the magnitude of the blurring function is different depending on the position on the imaging plane.

"Error of Distance Information"

If the curvature of field or single-sided blurring described above arises, an error arises in the calculated distance information. The reason therefor will be described. First, the distance estimation without error can be done in the center of the image plane by the above formula (2) and the distance information k without error can be obtained. In the periphery of the image plane, on the other hand, a deviation $\Delta\sigma$ arises in $\sigma_2$ and $\sigma_3$ due to a curvature of the image-forming plane. For example, the standard deviations of the blurring function in the periphery of the image plane are assumed to be given by formulas (6) and (7).

$$\sigma_2' = \sigma_2 + \Delta\sigma \quad (6)$$

$$\sigma_3' = \sigma_3 + \Delta\sigma \quad (7)$$

If the formulas (6) and (7) are substituted into the formula (2) and rearranged, obtained distance information k' is given by the following formula (8):

$$k' = \frac{(\sigma_3' - \sigma_2')(\sigma_3' + \sigma_2')}{\sigma_f^2} \quad (8)$$

$$= \frac{\{(\sigma_3 + \Delta\sigma) - (\sigma_2 + \Delta\sigma)\}}{\sigma_f^2}$$

$$= \frac{\{(\sigma_3 + \Delta\sigma) + (\sigma_2 + \Delta\sigma)\}}{\sigma_f^2}$$

$$= \frac{(\sigma_3 - \sigma_2)(\sigma_3 + \sigma_2 + 2\Delta\sigma)}{\sigma_f^2}$$

From the formula (8), a positive-side error $2\Delta\sigma$ arises for the distance information k in the center of the image plane.

Also, for example, the standard deviations of the blurring function in the periphery of the image plane are assumed to be given by formulas (9) and (10).

$$\sigma_2' = \sigma_2 - \Delta\sigma \quad (9)$$

$$\sigma_3' = \sigma_3 - \Delta\sigma \quad (10)$$

If the formulas (9) and (10) are substituted into the formula (2) and rearranged, obtained distance information k' is given by the following formula (11):

$$k' = \frac{(\sigma_3' - \sigma_2')(\sigma_3' + \sigma_2')}{\sigma_f^2} \quad (11)$$

$$= \frac{\{(\sigma_3 - \Delta\sigma) - (\sigma_2 - \Delta\sigma)\}}{\sigma_f^2}$$

$$= \frac{\{(\sigma_3 - \Delta\sigma) + (\sigma_2 - \Delta\sigma)\}}{\sigma_f^2}$$

$$= \frac{(\sigma_3 - \sigma_2)(\sigma_3 + \sigma_2 - 2\Delta\sigma)}{\sigma_f^2}$$

From the formula (11), a negative-side error $2\Delta\sigma$ arises for the distance information k in the center of the image plane.

Figure 15:
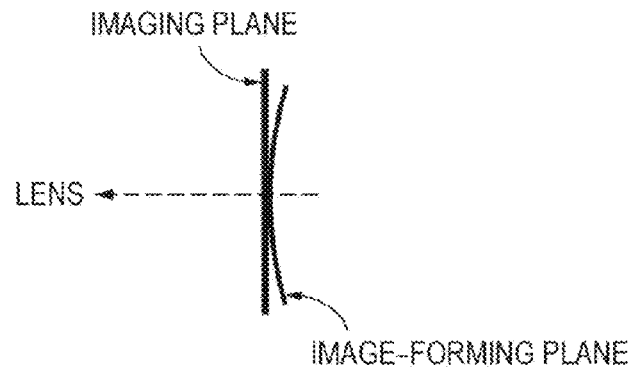
FIG. 15 is a schematic diagram showing an example of the curvature of field.
Figure 16:
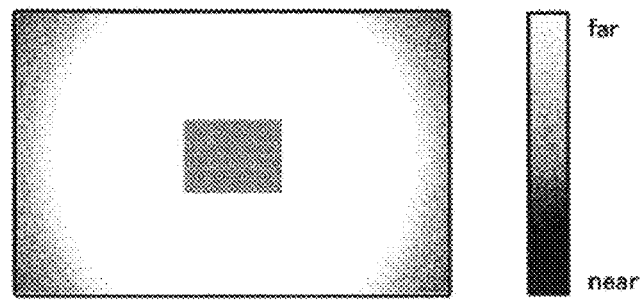
FIG. 16 is a schematic diagram illustrating an error of a distance map caused by an example of the curvature of field.

FIG. 15 shows an example of the curvature of field. FIG. 16 shows an example of a distance map obtained when the curvature of field shown in FIG. 15 arises. As an example of the subject, a subject in which a plane background in the same distance is arranged in the far distance and a rectangular object (foreground) is arranged in the near distance is assumed. In shades of color of a distance map, the denser (higher) the concentration, the nearer an object and the thinner (lower) the concentration, the farther an object.

As shown in FIG. 16, an object in close range positioned in the center of the image plane has a high concentration on a distance map, providing appropriate distance information. Further, the concentration on the distance map near the center of the image plane is low, providing appropriate distance information. In the periphery (edge) of the image plane, on the other hand, due to the influence of error described above, the far side, that is, a low concentration should be realized, but the near side, that is, a high concentration is realized. If the blurring processing shown in step S8 of FIG. 4 is performed by referring to such a distance map, the amount of blurring in the background portion where blurring processing should be applied will be lower than the appropriate amount. As a result, an image inappropriate for appreciation is generated.

Figure 17:
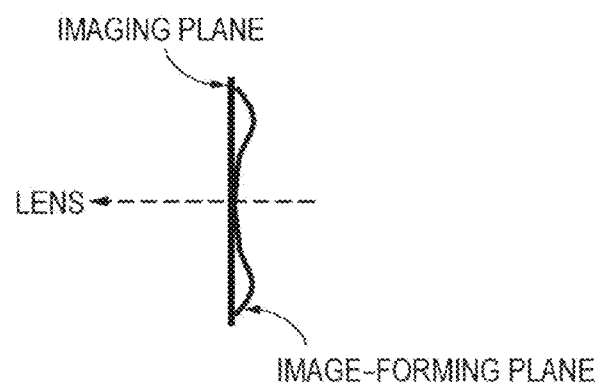
FIG. 17 is a schematic diagram showing another example of the curvature of field.
Figure 18:
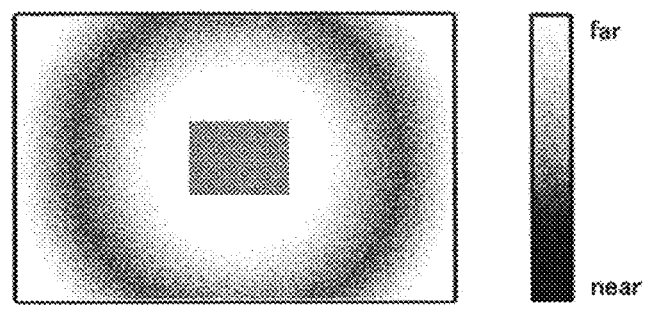
FIG. 18 is a schematic diagram illustrating an error of the distance map caused by another example of the curvature of field.

The curvature of field is rotationally symmetric with respect to the optical axis, but the amount of curvature of field in each image plane position is different depending on the lens design and lens state (such as the focal length, f-number, and focus position). FIG. 17 is another example of the curvature of field. FIG. 18 shows an example of the distance map obtained when the curvature of field shown in FIG. 17 arises.

In FIG. 18, appropriate distance information is obtained in the center of the image plane and the neighborhood thereof and the distance estimation is done accurately. However, due to the influence of error described above, shades of concentration arise concentrically. If such a distance map is referred to, it is difficult to perform appropriate blurring processing and, as a result, an image inappropriate for appreciation is generated.

Figure 19:
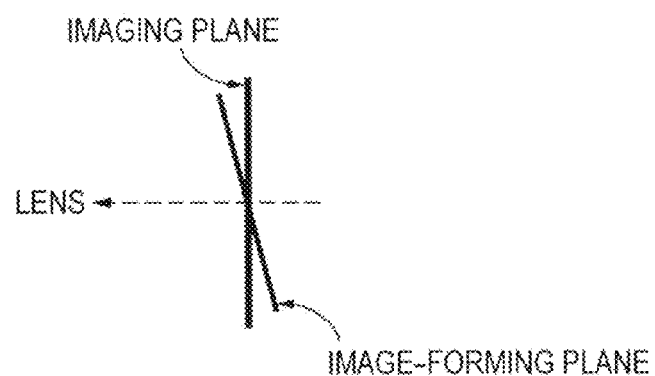
FIG. 19 is a schematic diagram showing an example of the single-sided blurring.
Figure 20:
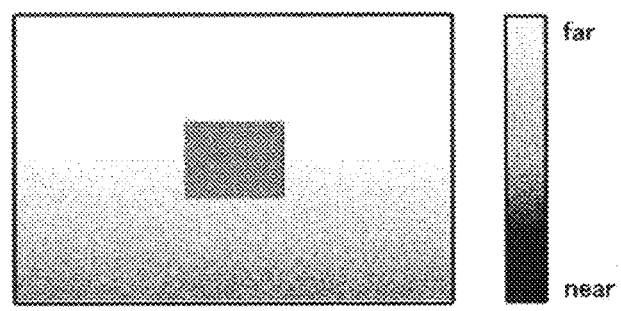
FIG. 20 is a schematic diagram illustrating an error of the distance map caused by an example of the single-sided blurring.

FIG. 19 shows an example of single-sided blurring. FIG. 20 shows an example of the distance map obtained when the single-sided blurring shown in FIG. 19 arises. In the distance map shown in FIG. 20, the distance estimation value to the background is not constant, causing an error in the up and down direction of the image plane. While the single-sided blurring in the up and down direction is illustrated here, but the single-sided blurring can arise also in a left and right direction or an oblique direction depending on variations of lenses.

"Distance Map Correction Processing in the First Embodiment"

To eliminate the influence of an error of distance information caused by a deviation of the blurring function described above, distance map correction processing described below is performed in the first embodiment of the present disclosure. The processing is performed by, for example, the distance information correction unit $5c$ and corresponds to the processing in step S7 of FIG. 4.

FIG. 21 is a flow chart exemplifying the distance map correction processing. The distance information k', which is the first distance information, is obtained for each pixel by the processing in step S6 of FIG. 4. Then, a distance map k'(x, y) constituted of the distance information k' for all pixels is obtained. (x, y) indicates coordinates on the image plane.

The distance map correction processing in the first embodiment calculates the correction value involved in a deviation of blurring by using Defocus information B(x, y), which is known information. Then, correction processing (operation) using the correction value is performed on the distance information k' to calculate distance information $k_{comp}$, which is second distance information. The distance information $k_{comp}$ is calculated for all pixels to generate a corrected distance map $k_{comp}(x, y)$ constituted of the distance information $k_{comp}$ for all pixels.

Figure 22:
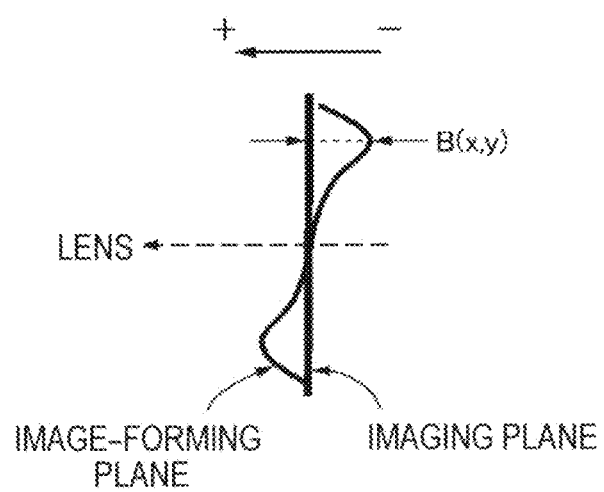
FIG. 22 is a schematic diagram illustrating the definition of a Defocus amount according to the first embodiment of the present disclosure.

FIG. 22 shows Defocus information B(x, y), which is an example of known information. The Defocus information B(x, y) is a physical distance representing a deviation amount of the imaging plane and the image-forming plane at each coordinate point on the image plane. The Defocus amount caused by a curvature of field is fixed when a lens is designed and is known. The Defocus amount caused by single-sided blurring is obtained as known information by, for example, photographing by using a resolution chart when a lens is manufactured and measuring the amount of blurring of the chart in each position of the image plane.

The Defocus information B(x, y) is stored in, for example, a storage unit such as a ROM connected to the control unit 5. The Defocus information B(x, y) may be transmitted from the imaging apparatus 3 to the signal processing apparatus 2 as a piece of specific information. The Defocus information B(x, y) may also be supplied to the signal processing apparatus 2 via a network.

To set the value of $k_{comp}(x, y)$ to k regardless of the position, as shown in the formula (12), a difference between the formulas (2) and (8) may be corrected. If the formulas (8) and (2) are substituted into k'(x, y) and k(x, y) respectively and rearranged, the following formula (12) is obtained. Because A is different depending on the position on the image plane, Δσ is shown as Δσ(x, y) in the form of a function.

$$k_{comp}(x, y) = k'(x, y) - \{k'(x, y) - k(x, y)\} \quad (12)$$
$$= k'(x, y) - \frac{2(\sigma_3 - \sigma_2)}{\sigma_f^2}\Delta\sigma(x, y)$$

The relationship shown in the formula (13) exists between the Defocus information B(x, y) and a difference Δσ(x, y) of the amount of blurring between the periphery and the center on the image plane. F in the formula (13) is the f-number.

$$\Delta\sigma(x, y) = \frac{B(x, y)}{F} \quad (13)$$

The reason why the relationship of the formula (13) is established will be described. The relation of f/D=B/Δσ exists from similitude relations between figures formed of beams of light, the position of focus and the like. f is the focal length and D is an effective diameter of the lens. Rearranging the relation yields Δσ=DB/f. Because the f-number is given by F=f/D, the formula (13) is derived.

If the formula (13) is substituted into the formula (12) and rearranged, the formula (14) is derived.

$$k_{comp}(x, y) = k'(x, y) - \frac{2(\sigma_3 - \sigma_2)}{\sigma_f^2}\frac{B(x, y)}{F} \quad (14)$$

Correction Value

In the formula (14), the function and variables appearing on the right side are all known. That is, the correction value necessary for processing can be obtained from known information. The correction value is subtracted from the first distance information k'(x, y) to calculate the distance information $k_{comp}(x, y)$, which is the second distance information. The correction processing is performed on all pixels to obtain the distance information $k_{comp}(x, y)$ for each pixel. Then, the corrected distance map $k_{comp}(x, y)$ without error constituted of the distance information $k_{comp}(x, y)$ of all pixels is obtained. In the processing in step S8 of FIG. 4, the blurring processing by referring to the corrected distance map $k_{comp}(x, y)$ is performed by the blurring processing application unit 6.

<2. Second Embodiment> "Distance Map Correction Processing in the Second Embodiment"

Next, the second embodiment will be described. In the second embodiment, content of the distance map correction processing in step S7 of FIG. 4 is different from content of the distance map correction processing in the first embodiment. The configuration of the signal processing apparatus 2 and the processing in steps S6 and S8 of FIG. 4 and the like are the same as in the first embodiment and thus, a duplicate description is omitted.

Figure 23:
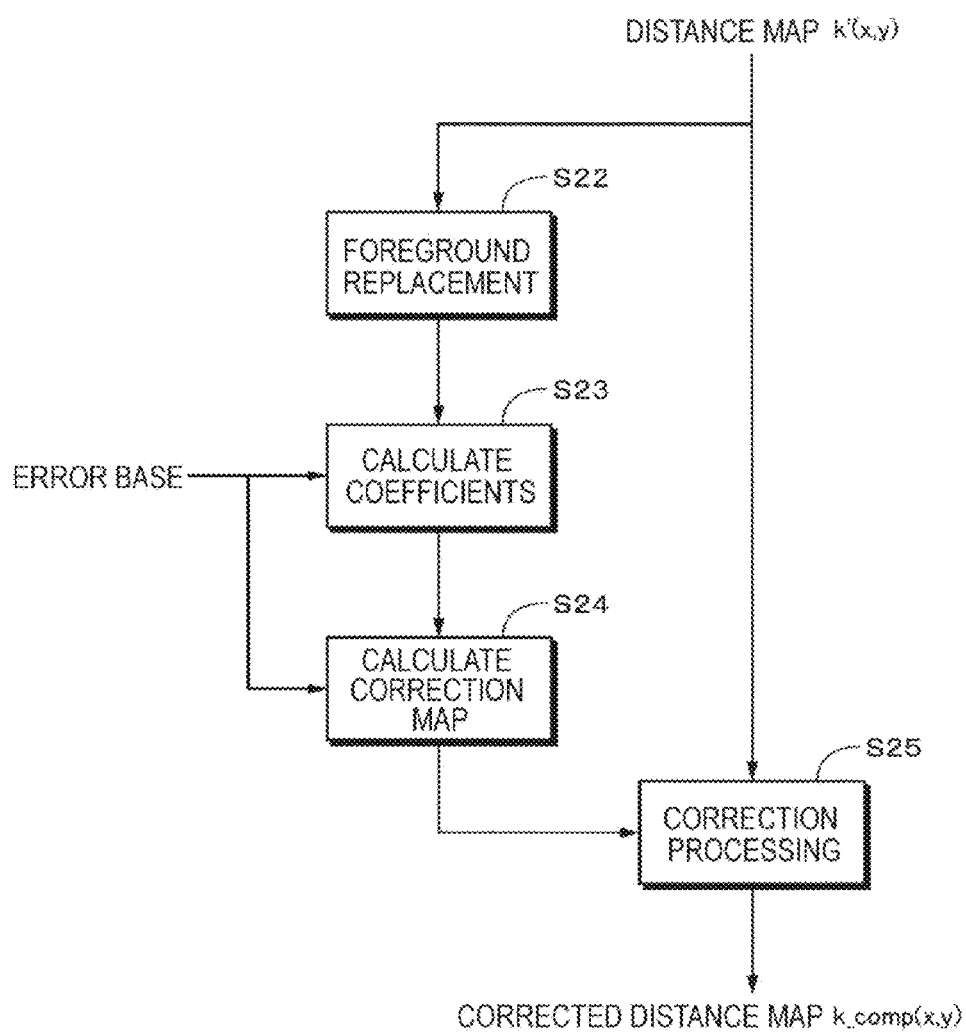
FIG. 23 is a flow chart illustrating processing to correct the distance information according to a second embodiment of the present disclosure.

While the correction value is calculated by using the known Defocus information in the first embodiment, in the second embodiment, the correction value is estimated by using a distance map constituted of first distance information. FIG. 23 is a flow chart exemplifying the flow of the distance map correction processing in the second embodiment. The distance map k'(x, y) constituted of the distance information k'(x, y) for all pixels is already generated by the processing in step S6 of FIG. 4.

In step S22, foreground replacement processing is performed. The foreground replacement processing replaces distance information of positions corresponding to a foreground subject in the distance map k'(x, y) by using a portion of distance information of positions corresponding to a background subject. For example, the distance information is replaced by interpolation. A distance map k'_bg(x, y) is generated by the foreground replacement processing. Then, the processing proceeds to step S23.

In step S23, coefficients for a plurality of two-dimensional bases modeling errors caused by, for example, the curvature of field and single-sided blurring for the distance map k'_bg(x, y) are calculated. If processing is performed in units of pixels, coefficients for a plurality of two-dimensional bases modeling errors of distance information for each pixel in the distance map k'_bg(x, y) are calculated. Then, the processing proceeds to step S24.

In step S24, a correction map is calculated as a linear sum using coefficients calculated in step S23 and bases. Then, the processing proceeds to step S25. In step S25, the correction map determined in step S24 is subtracted from the distance map k'(x, y) on which errors are superimposed to correct errors. Then, the corrected distance map $k_{comp}(x, y)$, which is a distance map after the correction, is generated.

The processing in each step of FIG. 23 will be described in detail. The foreground replacement processing in step S22 includes, for example, foreground discrimination processing to discriminate the range of a foreground subject and distance information replacement processing to replace distance information of positions corresponding to the range of the discriminated foreground subject with a portion of distance information of positions corresponding to a background subject.

Figure 24A:
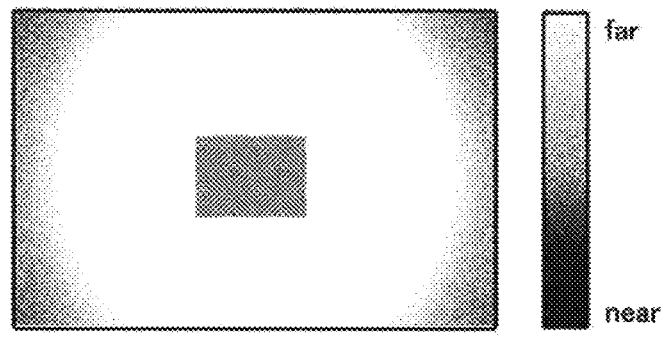
FIGS. 24A and 24B are schematic diagrams illustrating foreground replacement processing according to the second embodiment of the present disclosure.

FIG. 24A exemplifies the distance map k'(x, y) before the correction. In the distance map k'(x, y), the rectangular location near the center where the concentration is high is a foreground subject. The foreground discrimination processing discriminates the range of a foreground subject by, for example, setting a threshold for the distance information k'(x, y) for each pixel and comparing with the threshold. Instead of the threshold, the range of a foreground subject may be discriminated by other methods. For example, the range of a foreground subject may be discriminated by applying a publicly known technique to discriminate the range of persons in an image. Alternatively, an edge may be detected by image processing to discriminate the range formed by the detected edge as the range of a foreground subject.

Figure 24B:
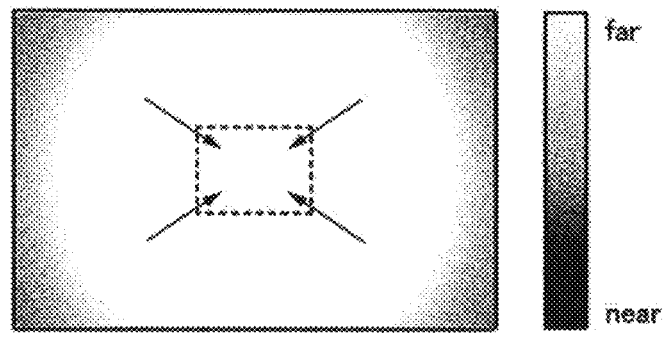

After the range of a foreground subject being discriminated, the distance information replacement processing is performed. As shown in FIG. 24B, distance information of positions corresponding to the range of the discriminated foreground subject is replaced with a portion of distance information of positions corresponding to a background subject. The distance information in the range of the foreground subject is replaced with, for example, distance information of the periphery (neighborhood) of the range of the foreground subject by interpolation. The distance information used for distance information replacement processing is distance information obtained by appropriate distance estimation. That is, in FIG. 24B, distance information estimated to be to the far side is used for the periphery of the range of the foreground subject. The distance map k'_bg(x, y) is generated by the distance information replacement processing.

When coefficients corresponding to each base are calculated by processing in step S23 described later, it is difficult to appropriately calculate coefficients if the foreground and the background are mixed in the whole distance map. Thus, the whole distance map is preferably configured only by the background. Therefore, the processing in step S22 is preferably performed.

Figure 25:
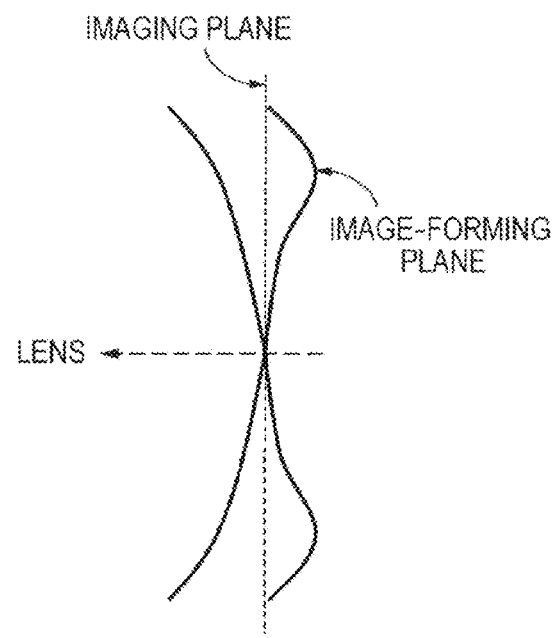
FIG. 25 is a schematic diagram showing a plurality of examples of the curvature of field.

Next, an error base used for processing in steps S23 and S24 will be described. The shape of a curvature of field changes significantly depending on the lens design and lens state (the focal length, f-number, and position of focus). FIG. 25 exemplifies the appearance (section) thereof. To estimate the amount of error of a curvature of field changing in various ways superimposed on distance information in a distance map from the distance map, one or a plurality of main components is extracted from various shapes of the curvature of field. One or the plurality of main components extracted may be stored in advance.

Figure 26:
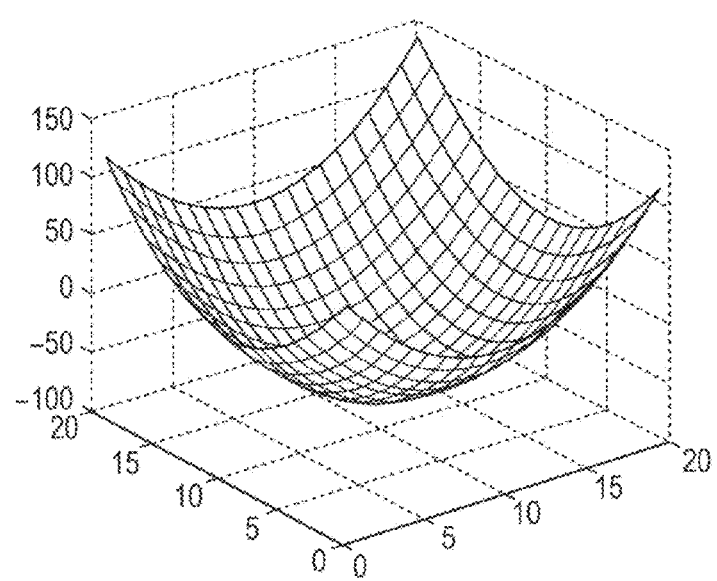
FIG. 26 is a schematic diagram exemplifying a base by a first main component of the curvature of field.
Figure 27:
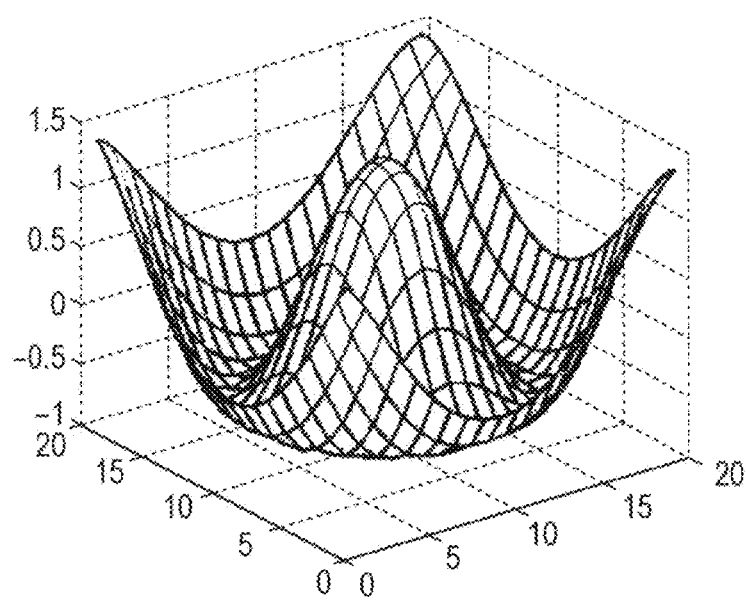
FIG. 27 is a schematic diagram exemplifying the base by a second main component of the curvature of field.

Then, the amount of error contribution caused by each main component is estimated by calculating coefficients when these main components are used as bases from the distance map. FIGS. 26 and 27 show examples of a base P_1(x, y) by a first main component extracted and a base P_2(x, y) by a second main component extracted respectively. The bases shown in FIGS. 26 and 27 correspond to each of the shapes of the curvature of field shown in FIG. 25.

Figure 28:
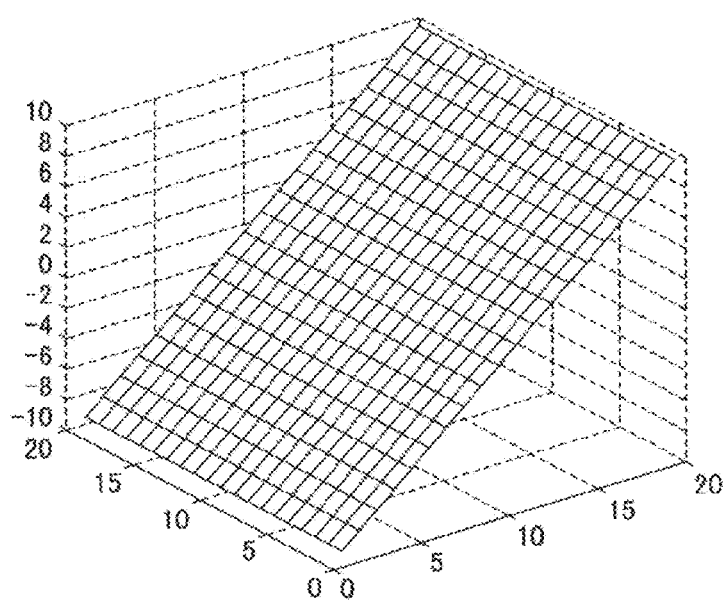
FIG. 28 is a schematic diagram exemplifying the base of the single-sided blurring in a vertical direction.
Figure 29:
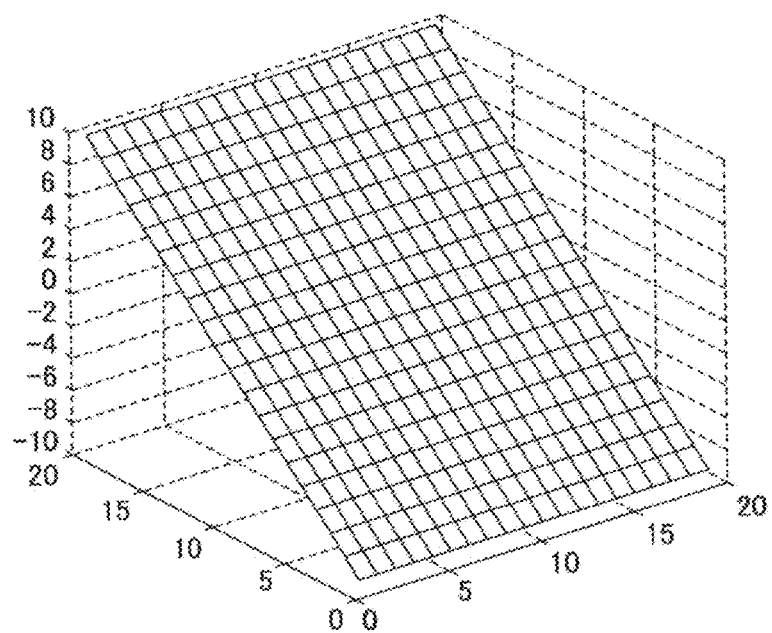
FIG. 29 is a schematic diagram exemplifying the base of the single-sided blurring in a horizontal direction.

Though single-sided blurring in various directions can arise, if at least two bases of single-sided blurring Q_1(x, y) in the vertical direction and single-sided blurring Q_2(x, y) in the horizontal direction are defined, single-sided blurring in various directions can sufficiently be represented as a linear sum of these bases. FIGS. 28 and 29 show examples of respective bases. Bases illustrated in FIGS. 26 to 29 may be stored in advance or supplied from outside the imaging apparatus 3 or the like. Information about bases stored or supplied from outside is acquired by the distance information correction unit 5c.

In step S23, as shown in the following formulas (15) to (18), coefficients pc_1, pc_2, qc_1, qc_2 contained in the two-dimensional distance map k'_bg(x, y) obtained by replacing foreground distance information with background distance information and corresponding to respective bases are calculated.

$$pc_1 = \sum_x \sum_y P_1(x, y) * k'_{bg}(x, y) \quad (15)$$

-continued $$pc_2 = \sum_x \sum_y P_2(x, y) * k'_{bg}(x, y) \qquad (16)$$

$$qc_1 = \sum_x \sum_y Q_1(x, y) * k'_{bg}(x, y) \qquad (17)$$

$$qc_2 = \sum_x \sum_y Q_2(x, y) * k'_{bg}(x, y) \qquad (18)$$

In step S24, a linear sum of each base as shown in the formula (19) is represented by using the coefficients determined in step S23. The processing is performed for all pixels to generate a correction map Err(x, y) for errors caused by the curvature of field and single-sided blurring.

$$Err(x,y) = pc_1 P_1(x,y) + pc_2 P_2(x,y) + qc_1 Q_1(x,y) + qc_2 Q_2(x, y) \qquad (19)$$

Lastly, in step S25, as shown in the formula (20), the correction map Err(x, y) is subtracted from the distance map k'(x, y). For example, distance information in the same position in the distance map k'(x, y) and the correction map Err(x, y) is subtracted. The processing shown in the formula (20) is performed on distance information of all pixels to generate the corrected distance map $k_{comp}$(x, y) in which errors caused by the curvature of field and single-sided blurring are corrected.

$$k_{comp}(x, y) = k'(x, y) - Err(x, y) \qquad (20)$$

Correction Value
<3. Third Embodiment>

Figure 30:
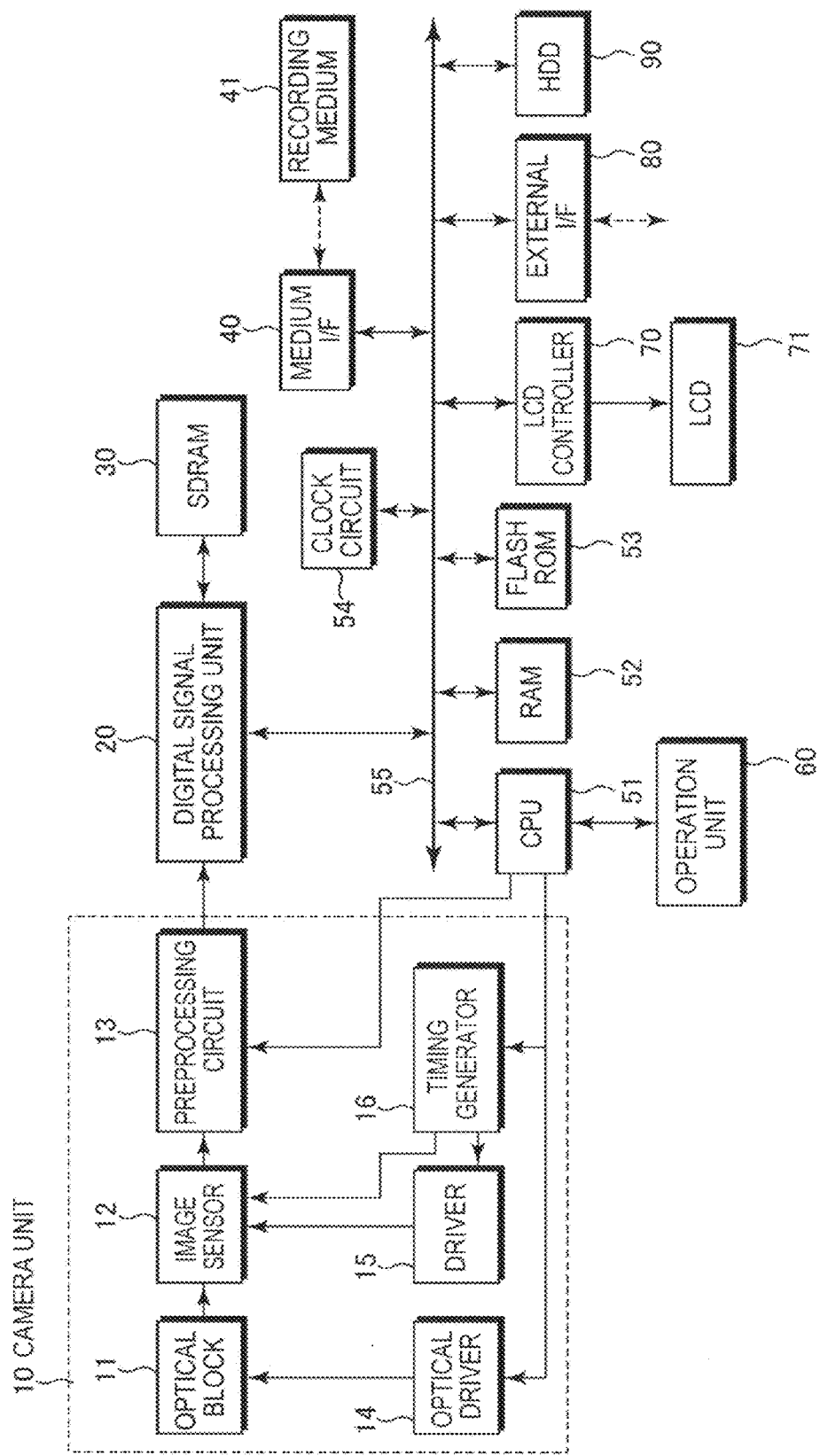
FIG. 30 is a block diagram exemplifying the configuration of an imaging apparatus according to a third embodiment of the present disclosure.

The present disclosure can also be configured as an imaging apparatus. FIG. 30 exemplifies the configuration of an imaging apparatus applicable to the present disclosure. The imaging apparatus includes a camera unit 10, a digital signal processing unit 20, an SDRAM (Synchronous Dynamic Random Access Memory) 30, a medium interface (hereinafter, denoted as a medium I/F) 40, an operation unit 60, an LCD (Liquid Crystal Display) controller 70, an LCD 71, an external interface (hereinafter, denoted as an external I/F) 80, and a hard disk drive 90 as a large-capacity recording medium and a recording medium 41 can be inserted into or removed from the medium I/F 40.

The recording medium 41 is, for example, a so-called memory card using a semiconductor memory. In addition to the memory card, a hard disk apparatus, an optical recording medium such as a recordable DVD (Digital Versatile Disc) and recordable CD (Compact Disc), or a magnetic disk can be used. In the imaging apparatus, further a CPU 51 as an example of the control unit, a RAM 52, a flash ROM 53, and a clock circuit 54 are connected to a system bus 55.

The camera unit 10 includes an optical block 11, an image sensor 12 such as a CCD or CMOS, a preprocessing circuit 13, an optical block driver 14, an image sensor driver 15, and a timing generator 16. The optical block 11 includes lenses, a focusing mechanism, a shutter mechanism, and an iris mechanism.

The CPU 51 is, for example, a microcomputer and controls each unit of the imaging apparatus. The RAM 52 is mainly used as a work area such as temporarily storing intermediate results of processing. The flash ROM 53 stores various programs executed by the CPU 51 and data necessary for processing. The Defocus information B(x, y), bases of main components, f-number of the imaging apparatus and the like are stored in the flash ROM 53. The clock circuit 54 has a function to provide the current date (year/month/day), current day of week, current time, shooting date and time and the like and also to add date/time information such as the shooting date and time to a shooting image file.

The optical block driver 14 forms a driving signal to operate the optical block 11 in accordance with the control from the CPU 51 during photographing to operate the optical block 11 by supplying the driving signal to the optical block 11. In the optical block 11, the focusing mechanism, shutter mechanism, and iris mechanism are controlled in accordance with the driving signal from the optical block driver 14 to capture a subject image and then, the subject image is provided to the image sensor 12.

The image sensor 12 performs a photoelectric conversion of the subject image from the optical block 11 and outputs the converted image. The image sensor 12 operates in accordance with the driving signal from the image sensor driver 15 to capture the subject image and the captured subject image is supplied to the preprocessing circuit 13 as an electric signal based on a timing signal from the timing generator 16 controlled by the CPU 51.

The timing generator 16 forms a timing signal that provides predetermined timing in accordance with the control from the CPU 51. The image sensor driver 15 forms a driving signal supplied to the image sensor 12 based on a timing signal from the timing generator 16.

The preprocessing circuit 13 performs CDS (Correlated Double Sampling) processing on the supplied imaging signal to improve the S/N ratio, performs AGC (Automatic Gain Control) processing thereon to control the gain, and then performs an A/D (Analog/Digital) conversion to form imaging data as a digital signal.

The digital imaging data from the preprocessing circuit 13 is supplied to the digital signal processing unit 20. The digital signal processing unit 20 performs camera signal processing such as de-mosaic processing, AF (Auto Focus), AE (Auto Exposure), and AWB (Auto White Balance) on the imaging data. The image data on which the camera signal processing has been performed is compressed by a predetermined compression method and supplied to the inserted recording medium 41 and/or the hard disk drive 90 through the system bus 55 and the medium I/F 40 to record the image data in the recording medium 41 and/or the hard disk drive 90 as an image file conforming to, for example, the DCF (Design rule for Camera File system) standard.

Intended image data of the image data recorded in the recording medium 41 is read from the recording medium 41 through the medium I/F 40 in accordance with operation input from a user accepted through the operation unit 60 and the read image data is supplied to the digital signal processing unit 20. The operation unit 60 includes various buttons such as a shutter release button, levers, and dials. The LCD 71 may be configured as a touch panel so that the user can perform an input operation by pressing on the screen using a finger or pointing device.

The digital signal processing unit 20 performs decompression processing of compression on the compressed image data read from the recording medium 41 and supplied through the medium I/F 40 to supply the decompressed image data to the LCD controller 70 through the system bus 55. The LCD controller 70 forms a display image signal supplied to the LCD 71 from the image data and supplies the display image signal to the LCD 71. Accordingly, an image in accordance with the image data recorded in the recording medium 41 is displayed in the screen of the LCD 71. Further, text such as a menu or graphics can be displayed in the screen of the LCD 71 under the control of the CPU 51 and the LCD controller 70. The form of the display in the screen follows a display processing program recorded in the flash ROM 53.

The imaging apparatus is provided with the external I/F 80. For example, an external personal computer is connected through the external I/F 80 and image data can be supplied from the personal computer to record the image data in the recording medium 41 inserted into the imaging apparatus or image data recorded in the recording medium 41 inserted into the imaging apparatus can be supplied to the external personal computer.

For example, a network such as the Internet is connected by connecting a communication module to the external I/F 80 and various kinds of image data and other information can be acquired through the network to record such data in a recording medium inserted into the imaging apparatus or data recorded in a recording medium inserted into the imaging apparatus can be transmitted to an intended destination through the network.

Moreover, information such as image data acquired from an external personal computer or through a network and recorded in a recording medium can be read and reproduced and displayed in the LCD 71.

Incidentally, the external I/F 80 can be provided as a wired interface such as IEEE (Institute of Electrical and Electronics Engineers) 1394 and USB (Universal Serial Bus) or as a wireless interface by light or by radio waves. That is, the external I/F 80 may be wired or wireless interface. For example, an external computer apparatus (not shown) is connected through the external I/F 80 and image data supplied from the computer apparatus can be recorded in the recording medium 41 and/or the hard disk drive 90. Image data recorded in the recording medium 41 and/or the hard disk drive 90 can also be supplied to an external computer apparatus.

Subject images (still images and dynamic images) can be captured by the above imaging apparatus to record the images in the inserted recording medium 41 and/or the hard disk drive 90. Further, image data recorded in the recording medium 41 and/or the hard disk drive 90 can be read to display images or optionally browse or edit images. An index file to manage image data is recorded in a specific region of the recording medium 41 and/or the hard disk drive 90.

The operation of the above imaging apparatus will briefly be described. A signal received by the image sensor 12 and photoelectrically converted is supplied to the preprocessing circuit 13 in which the signal undergoes CDS processing and AGC processing and is converted into a digital signal before being supplied to the digital signal processing unit 20. Image quality correction processing is performed by the digital signal processing unit 20 on image data, which is temporarily stored in the RAM 52 as image data of a camera-through image.

The image stored in the RAM 52 is supplied to the LCD controller 70 under the control of the CPU 51 and a camera through image is displayed in the LCD 71. The angle of view can be adjusted while viewing the camera through image displayed in the LCD 71. The image data may directly be supplied to the LCD controller 70 from the digital signal processing unit 20 without being stored in the RAM 52.

Then, when the shutter release button of the operation unit 60 is pressed, the CPU 51 outputs a control signal to the camera unit 10 to operate the shutter of the optical block 11. At the same time, image data (recorded image data) for one frame supplied from the preprocessing circuit 13 is processed by the digital signal processing unit 20 and stored in the SDRAM 30. Further, the recorded image data is compressed and encoded by the digital signal processing unit 20 and the encoded data is stored in the hard disk 90 and also stored in the recording medium 41 through the system bus 55 and the medium I/F 4.

The CPU 51 may acquire the date/time or the time of photographing from the clock circuit 54 to add the acquired time information to still image data. Further, reduced image data of still images may further be generated for still image data so that the still image data is stored in the hard disk drive 90 and the recording medium 41 by being associated with the original still image data.

On the other hand, when recorded image data stored in the hard disk drive 90 or the recording medium 41 is reproduced, recorded image data selected by the CPU 51 is read from the SDRAM 30 in accordance with operation input from the operation unit 60. The read recorded image data is decoded by the digital signal processing unit 20. The decoded image data is supplied to the LCD 71 through the LCD controller 70 and the reproduced image is displayed in the LCD 71.

Figure 31:
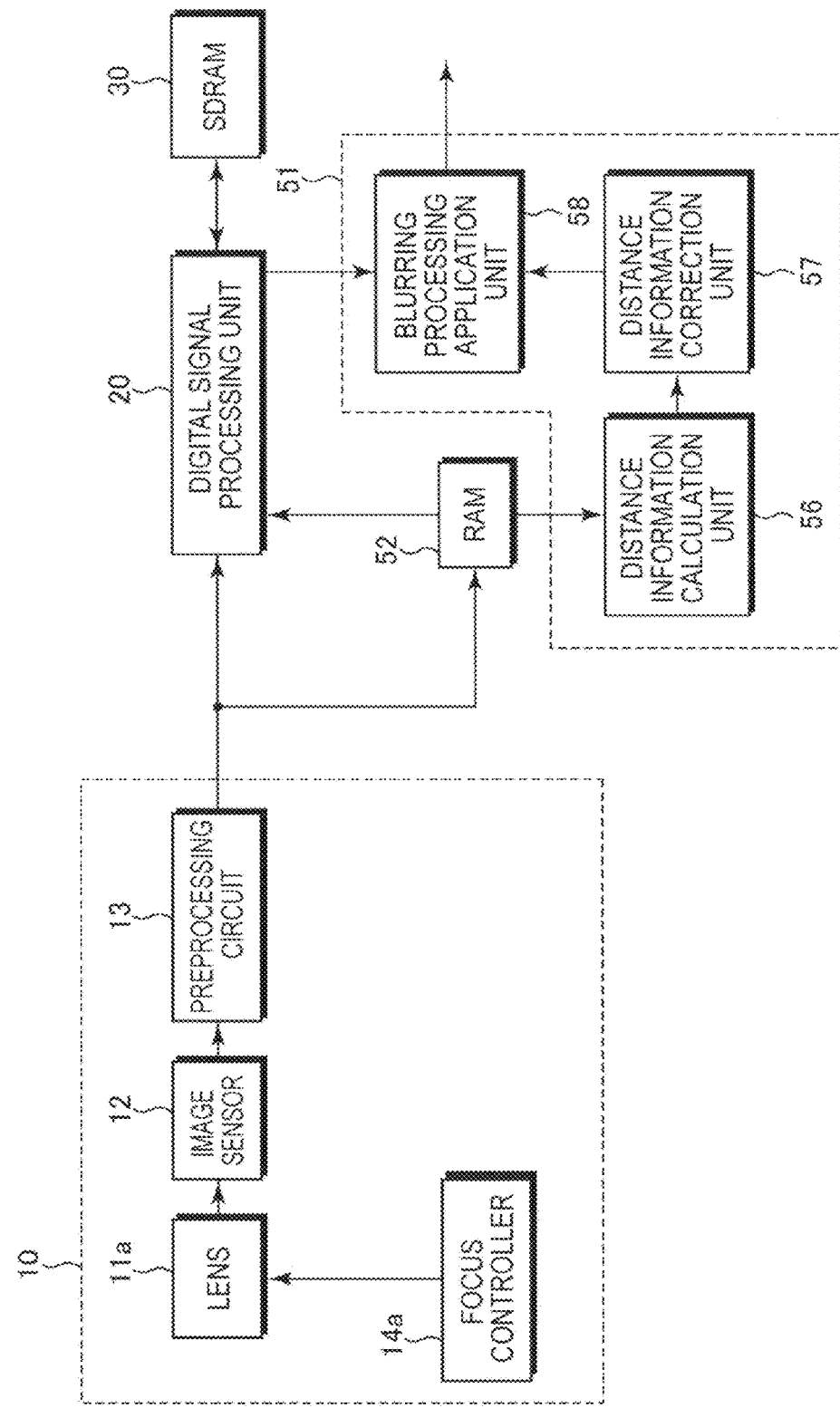
FIG. 31 is a block diagram showing a portion of the configuration of the imaging apparatus according to the third embodiment of the present disclosure.

FIG. 31 shows an example of the configuration of the CPU 51 of the above imaging apparatus and the like. The CPU 51 includes at least a distance information calculation unit 56 and a distance information correction unit 57. As shown in FIG. 31, the CPU 51 may be configured to include a blurring processing application unit 58. The CPU 51 may also be configured to include the RAM 52. The focus is controlled by a lens 11*a* inside the optical block 11 being controlled by a focus controller 14*a*. The focus controller 14*a* includes the CPU 51 and the optical block driver 14.

A plurality of image shots of mutually different focusing is acquired under the control of the focus controller 14*a* in the imaging apparatus. For example, an image (called a first image) in which a subject, for example, a person in the foreground is in focus is acquired. Next, the same subject is captured by shifting the focus to the far side by a predetermined distance with respect to the first image to acquire an image (called a second image). Further, the same subject is captured by shifting the focus to the near side by the predetermined distance with respect to the first image to acquire an image (called a third image). These three images are temporarily stored in the RAM 52 as a data storage unit.

The second image and the third image of the three images are used by the distance information calculation unit 56 to calculate, for example, distance information for each pixel. Then, a distance map constituted of distance information of all pixels is generated. The processing by the distance information calculation unit 56 is the same as the processing by the distance information calculation unit 5*b* described above and thus, a detailed description thereof is omitted.

The distance map generated by the distance information calculation unit 56 is supplied to the distance information correction unit 57. The distance information correction unit 57 corrects the distance information for each pixel in the supplied distance map. Then, a corrected distance map constituted of distance information of all pixels after the correction is generated. The processing by the distance information correction unit 57 is the same as the processing by the distance information correction unit 5*c* in the first or second embodiment described above and thus, a detailed description thereof is omitted. The respective processing of the distance information correction unit 5*c* in the first and second embodiments may be set as modes so that the mode is switched and performed by the distance information correction unit 57.

The corrected distance map generated by the distance information correction unit 57 is supplied to the blurring processing application unit 58. The blurring processing application unit 58 performs blurring processing referring to the corrected distance map and, for example, an image suitable for appreciation with a blurred background is generated. The processing by the blurring processing application unit 58 is the same as the processing by the blurring processing application unit 6 and thus, a detailed description thereof is omitted. The generated image may be supplied to the LCD 71 via the system bus 55 and the LCD controller 70. As described above, the present disclosure can be configured as, for example, an imaging apparatus.

<4. Modification>

In the foregoing, a plurality of embodiments of the present disclosure has been concretely described, but the present disclosure is not limited to these embodiments. In the above embodiments, for example, application examples to errors caused by the curvature or field or single-sided blurring are shown, but the present disclosure may similarly be applied to other kinds of aberration.

Further, in the above embodiments, a plurality of images is acquired by changing the position of focus and then, a distance map is generated based on differences of blurring functions of these images. However, a plurality of images may be acquired by changing the iris to generate a distance map based on differences of blurring functions of these images. Further, in the above embodiments, examples of using a distance map for blurring processing are shown. In addition, processing to generate a stereo image from a plurality of parallax images or generation processing of a field depth extended image by deconvolution in accordance with the distance may also be performed by using the distance map. Also, degradation in quality of an appreciation image caused by the curvature of field or single-sided blurring may be corrected by deconvolution by using the distance map.

In the above embodiments, content of processing in the second embodiment may adaptively be changed in accordance with the distribution of, for example, distance information equal to a threshold or more in the distance map obtained in step S6 of FIG. 4. It is assumed, for example, that the distance map shown in FIG. 16 or FIG. 18 is obtained by step S6. Because an error in distance estimation is caused by the curvature of field in this case, the coefficients pc_1, pc_2 may be calculated, instead of coefficients for all bases. If the distance map shown in FIG. 20 is obtained by step S6, the coefficients qc_1, qc_2 may be calculated because an error in distance estimation is caused by single-sided blurring. Accordingly, the amount of computation in the distance map correction processing can be reduced.

In the above embodiments, the control unit 5 in the signal processing apparatus 2 may be configured by a distance information input unit into which first distance information is input and the distance information correction unit 5c that corrects the input distance information.

Configurations and content of processing in the plurality of embodiments and the modification described above may mutually applied as long as technical inconsistency does not arise. Further, the present disclosure can be configured, in addition to the apparatus, as a method, a program, or a recording medium recording the program.

It should be understood by those skilled in the art that various modifications, combinations, sub-combinations and alterations may occur depending on design requirements and other factors insofar as they are within the scope of the appended claims or the equivalents thereof.

The present technology may also be configured as below.

(1) A signal processing apparatus, comprising:
an input unit into which first image data and second image data are input, the first image data and the second image data being obtained by capturing a predetermined subject with an imaging unit and having mutually different states of blurring;
a distance information calculation unit that calculates first distance information in accordance with a position in a depth direction of the subject based on the first image data and the second image data; and
a distance information correction unit that calculates second distance information by performing, on the first distance information, processing to correct a deviation of the blurring caused by a mismatch between an image-forming plane of the subject and an imaging plane of the imaging unit.

(2) The signal processing apparatus according to (1),
wherein the distance information correction unit calculates a correction value to correct a deviation of the blurring by using known information and calculates the second distance information by performing, on the first distance information, processing using the correction value.

(3) The signal processing apparatus according to (1),
wherein the distance information correction unit calculates a correction value to correct a deviation of the blurring by using the first distance information and calculates the second distance information by performing, on the first distance information, processing using the correction value.

(4) The signal processing apparatus according to (3),
wherein the distance information correction unit acquires a plurality of bases modeling an error superimposed on the first distance information and calculates the correction value to correct the deviation of the blurring by using the first distance information and the plurality of bases.

(5) The signal processing apparatus according to (4),
wherein the distance information correction unit calculates the correction value to correct the deviation of the blurring by representing the first distance information as a linear sum of the plurality of bases.

(6) The signal processing apparatus according to (3),
wherein the subject includes a foreground subject and a background subject, and
the distance information correction unit replaces the first distance information in positions corresponding to the foreground subject by using a portion of the first distance information in positions corresponding to the background subject and calculates the correction value to correct the deviation of the blurring by using the first distance information in positions corresponding to the background subject and the first distance information after being replaced.

(7) The signal processing apparatus according to any one of (1) to (6),
wherein the first image data is obtained by capturing the subject in a first optical unit state of the imaging unit,
the second image data is obtained by capturing the subject in a second optical unit state of the imaging unit, and
the first optical unit state and the second optical unit state are mutually different states of a position of focus.

(8) The signal processing apparatus according to any one of (1) to (6),
wherein the first image data is obtained by capturing the subject in a first optical unit state of the imaging unit,
the second image data is obtained by capturing the subject in a second optical unit state of the imaging unit, and
the first optical unit state and the second optical unit state are mutually different states of an iris.

(9) The signal processing apparatus according to any one of (1) to (8),
wherein the distance information calculation unit performs blurring processing of adding the blurring to the first image data through a filter, determines a similarity between the first image data to which the blurring has been added and the second image data, detects the number of times of the blurring processing when the similarity is maximum, and calculates the first distance information from the detected number of times of the blurring processing.

(10) The signal processing apparatus according to (9), wherein the number of times of the blurring processing that adds no blurring is set as 0.

(11) An imaging apparatus, comprising:
an imaging unit;
an input unit into which first image data and second image data are input, the first image data and the second image data being obtained by capturing a predetermined subject with the imaging unit and having mutually different states of blurring;
a distance information calculation unit that calculates first distance information in accordance with a position in a depth direction of the subject based on the first image data and the second image data; and
a distance information correction unit that calculates second distance information by performing, on the first distance information, processing to correct a deviation of the blurring caused by a mismatch between an image-forming plane of the subject and an imaging plane of the imaging unit.

(12) A signal processing method for a signal processing apparatus, the method comprising:
inputting first image data and second image data, the first image data and the second image data being obtained by capturing a predetermined subject with an imaging unit and having mutually different states of blurring;
calculating first distance information in accordance with a position in a depth direction of the subject based on the first image data and the second image data; and
calculating second distance information by performing, on the first distance information, processing to correct a deviation of the blurring caused by a mismatch between an image-forming plane of the subject and an imaging plane of the imaging unit.

(13) A program causing a computer to execute a signal processing method for a signal processing apparatus, the method comprising:
inputting first image data and second image data, the first image data and the second image data being obtained by capturing a predetermined subject with an imaging unit and having mutually different states of blurring;
calculating first distance information in accordance with a position in a depth direction of the subject based on the first image data and the second image data; and
calculating second distance information by performing, on the first distance information, processing to correct a deviation of the blurring caused by a mismatch between an image-forming plane of the subject and an imaging plane of the imaging unit.

What is claimed is:

1. A signal processing apparatus, comprising:
an interface configured to connect the signal processing apparatus to an imaging apparatus, wherein an imaging unit of the imaging apparatus is configured to capture a subject with different states of blur to respectively obtain a first image data and a second image data;
a processor; and
a memory, coupled to the processor, wherein the processor is configured to:
receive the first image data and the second image data;
calculate a first distance information in accordance with a position in a depth direction of the subject based on the first image data and the second image data, wherein the first distance information is based upon distance information of a representative pixel located in the center of a determined range of pixels in each of the first image data and the second image data;
calculate a second distance information based on the calculated first distance information and a correction value to correct a deviation of the blur caused by a mismatch between a first plane of the subject and a second plane of the imaging unit, wherein the correction value is calculated based on known defocus information; and
perform a blurring processing based on the second distance information, and
wherein the known defocus information corresponds to a physical distance that represents a deviation amount of the second plane of the imaging unit and the first plane of the subject at each coordinate point on an image plane.

2. The signal processing apparatus according to claim 1, wherein to obtain the first image data, the subject is captured in a first optical unit state of the imaging unit, and to obtain the second image data, the subject is captured in a second optical unit state of the imaging unit, and
wherein the first optical unit state and the second optical unit state are mutually different states of a position of focus.

3. The signal processing apparatus according to claim 1, wherein to obtain the first image data, the subject is captured in a first optical unit state of the imaging unit, and to obtain the second image data, the subject is captured in a second optical unit state of the imaging unit, and
wherein the first optical unit state and the second optical unit state are mutually different states of an iris.

4. The signal processing apparatus according to claim 1, wherein the processor is further configured to:
add blur to the first image data through a filter;
determine a similarity between the blur added first image data and the second image data;
detect a number of times of the addition of the blur to the first image data for which the similarity is maximum; and
calculate the first distance information from the detected number of times of the addition of the blur.

5. The signal processing apparatus according to claim 4, wherein the number of times of the addition of the blur that adds no blur is set as 0.

6. An imaging apparatus, comprising:
an imaging unit configured to capture a subject with different states of blur to respectively obtain a first image data and a second image data;
a processor; and
a memory, coupled to the processor, wherein the processor is configured to:
receive the first image data and the second image data;
calculate a first distance information in accordance with a position in a depth direction of the subject based on the first image data and the second image data, wherein the first distance information is based upon distance information of a representative pixel located in the center of a determined range of pixels in each of the first image data and the second image data;

calculate a second distance information based on the first distance information and a correction value to correct a deviation of the blur caused by a mismatch between a first plane of the subject and a second plane of the imaging unit, wherein the correction value is calculated based on known defocus information; and perform a blurring processing based on the second distance information, and wherein the known defocus information corresponds to a physical distance that represents a deviation amount of the second plane of the imaging unit and the first plane of the subject at each coordinate point on an image plane.

7. A signal processing method, the method comprising:

in a signal processing apparatus:

inputting a first image data and a second image data, wherein the first image data and the second image data are obtained by capturing a subject with an imaging unit, and wherein the first image data and the second image data are obtained with mutually different states of blurring;

calculating a first distance information in accordance with a position in a depth direction of the subject based on the first image data and the second image data, wherein the first distance information is based upon distance information of a representative pixel located in the center of a determined range of pixels in each of the first image data and the second image data;

calculating a second distance information based on the first distance information and a correction value to correct a deviation of the blurring caused by a mismatch between a first plane of the subject and a second plane of the imaging unit, wherein the correction value is calculated based on known defocus information; and performing a blurring processing based on the second distance information, and wherein the known defocus information corresponds to a physical distance that represents a deviation amount of the second plane of the imaging unit and the first plane of the subject at each coordinate point on an image plane.

8. A non-transitory computer-readable storage medium, having stored thereon a set of computer-executable instructions, that when executed by a processor, cause a computer to perform operations, the operations comprising:

inputting a first image data and a second image data, wherein the first image data and the second image data are obtained by capturing a subject with an imaging unit, and wherein the first image data and the second image data are obtained with mutually different states of blurring;

calculating a first distance information in accordance with a position in a depth direction of the subject based on the first image data and the second image data, wherein the first distance information is based upon distance information of a representative pixel located in the center of a determined range of pixels in each of the first image data and the second image data;

calculating a second distance information based on the first distance information and a correction value to correct a deviation of the blurring caused by a mismatch between a first plane of the subject and a second plane of the imaging unit, wherein the correction value is calculated based on known defocus information; and performing a blurring processing based on the second distance information, and wherein the known defocus information corresponds to a physical distance that represents a deviation amount of the second plane of the imaging unit and the first plane of the subject at each coordinate point on an image plane.

* * * * *